(12) United States Patent
Yamaguchi et al.

(10) Patent No.: US 12,443,042 B2
(45) Date of Patent: Oct. 14, 2025

(54) HEAD-MOUNTED DISPLAY APPARATUS

(71) Applicant: SEIKO EPSON CORPORATION, Tokyo (JP)

(72) Inventors: Tokito Yamaguchi, Azumino (JP); Masayuki Takagi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 280 days.

(21) Appl. No.: 18/192,880

(22) Filed: Mar. 30, 2023

(65) Prior Publication Data

US 2023/0314813 A1    Oct. 5, 2023

(30) Foreign Application Priority Data

Mar. 31, 2022  (JP) .................................. 2022-060947

(51) Int. Cl.
*G02B 27/01*         (2006.01)
*G09G 3/00*          (2006.01)

(52) U.S. Cl.
CPC ......... *G02B 27/0172* (2013.01); *G09G 3/002* (2013.01); *G02B 2027/0116* (2013.01); *G02B 2027/0178* (2013.01); *G09G 2320/0242* (2013.01); *G09G 2320/028* (2013.01)

(58) Field of Classification Search
CPC ............. G09G 3/002; G09G 2320/028; G09G 2320/02
See application file for complete search history.

(56) References Cited

U.S. PATENT DOCUMENTS

| 2008/0055193 | A1  | 3/2008  | Tsuyuki et al. |
| 2010/0066926 | A1* | 3/2010  | Tanijiri ............... G02F 1/13362 349/11 |
| 2011/0012874 | A1* | 1/2011  | Kurozuka ............ G02B 26/105 345/204 |
| 2017/0264891 | A1* | 9/2017  | Iwasaki ............... H04N 13/373 |
| 2017/0295353 | A1* | 10/2017 | Hwang ............... H04N 13/344 |
| 2017/0318270 | A1* | 11/2017 | Fukuda ............... H04N 9/3185 |
| 2021/0101531 | A1* | 4/2021  | Imamura .................. G06T 5/80 |

FOREIGN PATENT DOCUMENTS

JP    2008-058703 A    3/2008

\* cited by examiner

*Primary Examiner* — Grace Q Li
(74) *Attorney, Agent, or Firm* — Oliff PLC

(57) ABSTRACT

A head-mounted display apparatus includes a control unit configured to correct a video, a display element configured to display the video corrected by the control unit, a first optical member on which video light corresponding to the video is incident, and a reflection member configured to reflect the video light from the first optical member to project a virtual image corresponding to the video. The first optical member and the reflection member correct distortion of the virtual image in a first direction. The control unit corrects the video based on distortion of the virtual image in a second direction crossing the first direction.

15 Claims, 17 Drawing Sheets

HEAD-MOUNTED DISPLAY APPARATUS

The present application is based on, and claims priority from JP Application Serial Number 2022-060947, filed Mar. 31, 2022, the disclosure of which is hereby incorporated by reference herein in its entirety.

BACKGROUND

1. Technical Field

The present disclosure relates to a head-mounted display apparatus that enables observation of a virtual image.

2. Related Art

JP-A-2008-058703 discloses a virtual image display device in which a drive circuit for operating an image display element performs, as a processing unit, distortion correction of applying distortion, in a direction opposite to distortion produced by an optical system for observing an image displayed on an image display element, to an input image displayed on the image display element in accordance with vertical and horizontal distortion and displays the image as a result of the distortion processing, on the image display element.

With the above-described apparatus disclosed in JP-A-2008-058703, since the processing unit performs the inverse correction corresponding to the distortion in the vertical direction and the left and right direction, that is, in the longitudinal direction and transverse direction of the image, a large load is imposed on the processing unit.

SUMMARY

A head-mounted display apparatus according to an aspect of the present disclosure includes a control unit configured to correct a video, a display element configured to display the video corrected by the control unit, a first optical member on which video light corresponding to the video is incident, and a reflection member configured to reflect the video light from the first optical member to project a virtual image corresponding to the video, in which the first optical member and the reflection member correct distortion of the virtual image in a first direction, and the control unit corrects the video based on distortion of the virtual image in a second direction crossing the first direction.

DESCRIPTION OF EXEMPLARY EMBODIMENTS

First Embodiment

Next, a head-mounted display apparatus according to a first embodiment of the present disclosure will be described with reference to FIG. 1 to FIG. 3 and the like.

Figure 1:
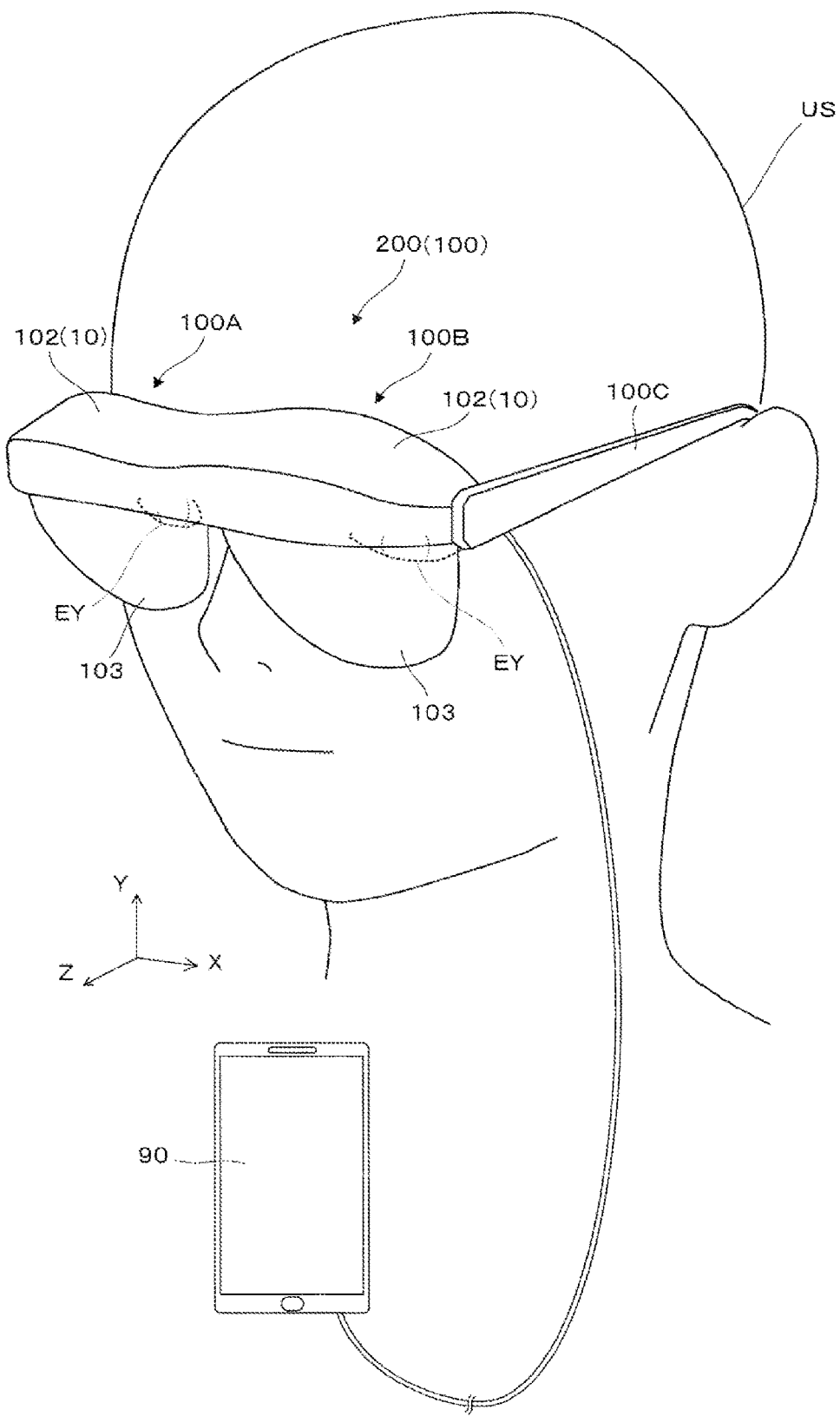
FIG. 1 is an external perspective view illustrating a mounted state of a head-mounted display apparatus according to a first embodiment.

FIG. 1 is a diagram illustrating a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are in an orthogonal coordinate system, the +X direction corresponds to a transverse direction in which the two eyes EY of the observer or wearer US who is wearing the HMD 200 or a head-mounted display apparatus 100 are disposed, the +Y direction corresponds to an upward direction orthogonal to the transverse direction in which the two eyes EY of the wearer US are disposed, and the +Z direction corresponds to the front direction or the forward direction for the wearer US. The ±Y directions are parallel to the vertical axis or the vertical direction.

The HMD 200 includes a first display device 100A for the right eye, a second display device 100B for the left eye, a pair of temple type support devices 100C that support the display devices 100A and 100B, and a user terminal 90 that is an information terminal. The first display device 100A includes a display drive part 102 disposed at an upper portion thereof, and an exterior member 103 that has a spectacle lens shape and covers the front of the eye. Similarly, the second display device 100B is constituted of a display drive part 102 disposed at an upper portion thereof, and an exterior member 103 that has a spectacle lens shape and covers the front of the eye. The support devices 100C are each a mounted member mounted to the head of the wearer US, and supports the upper end side of the exterior member 103 via the display drive part 102. The first display device 100A and the second display device 100B are optically inverted left and right, and hereinafter, the detailed description on the second display device 100B will be omitted.

Figure 2:
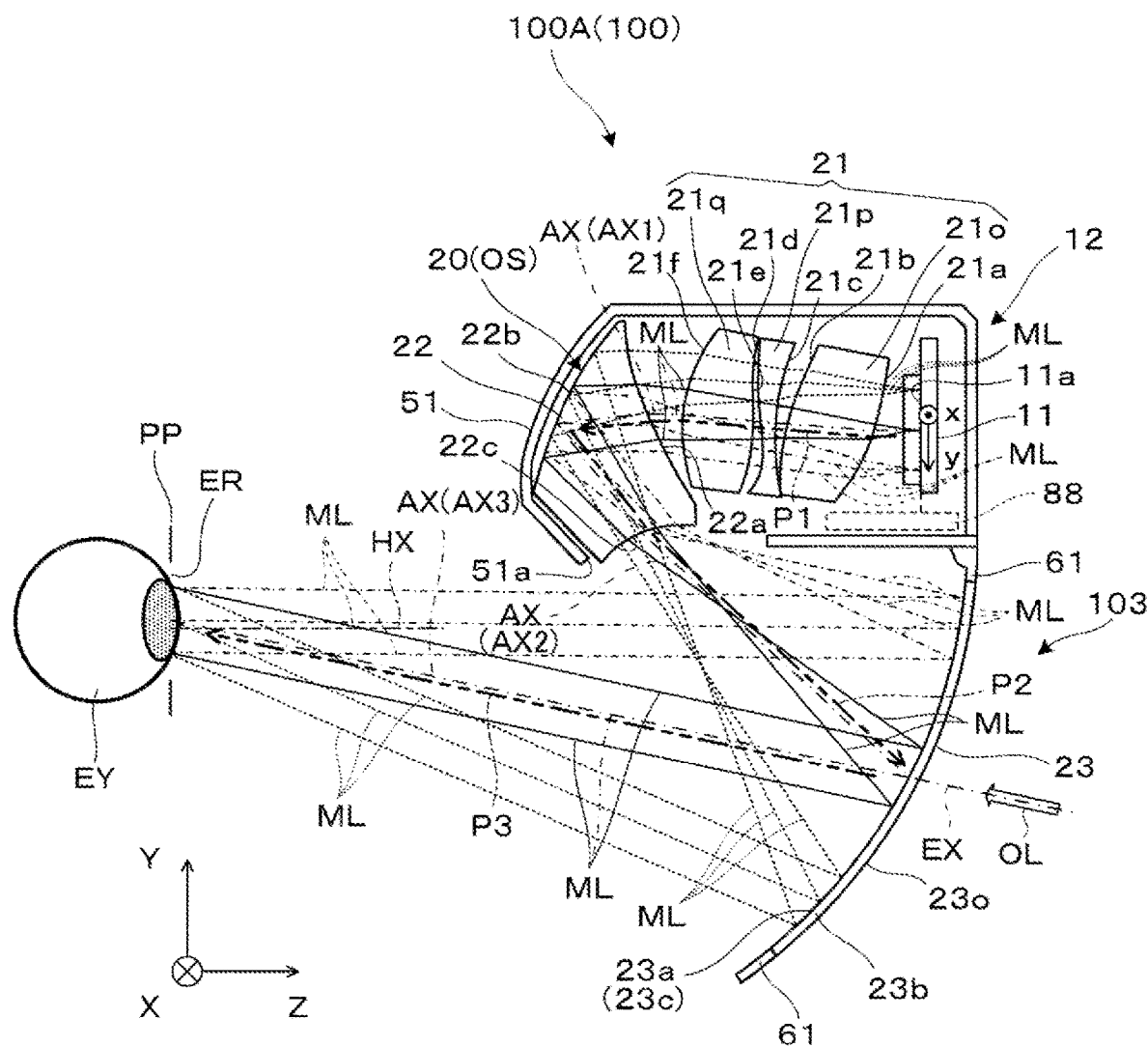
FIG. 2 is a side cross-sectional view illustrating an internal structure of the head-mounted display apparatus.

FIG. 2 is a side cross-sectional view illustrating an optical structure of the first display device 100A. The first display device 100A includes a display element 11, an imaging optical system 20, and a display control device 88. The imaging optical system 20 includes a projection lens 21, a prism mirror 22, and a see-through mirror 23. In the imaging optical system 20, the projection lens 21 and the prism mirror 22 respectively correspond to a second optical member and a first optical member on which video light or image light ML corresponding to a video or an image is incident, and the see-through mirror 23 corresponds to a reflection member that reflects the image light ML, emitted from the optical member, toward the eyes EY or a pupil position PP. In the imaging optical system 20, the projection lens 21 and the prism mirror 22 correspond to the display drive part 102 illustrated in FIG. 1, and the see-through mirror 23 corresponds to the exterior member 103 illustrated in FIG. 1. A combination of the display element 11, the projection lens 21, and the prism mirror 22 is referred to as a projection optical system 12, and these components are fixed in a case 51 in a mutually aligned state. The case 51 is a housing or a supporting member formed of a light-shielding material and supports the display control device 88 that operates the display element 11. The case 51 includes an opening 51a. The opening 51a enables the projection optical system 12 to emit the image light ML to the outside.

The first display device 100A corrects the distortion of the virtual image in a first direction by the prism mirror 22, which is the first optical member, and the see-through mirror 23, which is the reflection member. In the present embodiment, for example, the prism mirror 22 and the see-through mirror 23 correct distortion of the virtual image in the first direction, specifically, in the vertical direction. The first display device 100A corrects the video or the image based on a distortion of the virtual image in a second direction crossing the first direction, using the display control device 88. In the present embodiment, for example, the display control device 88 corrects distortion in a left and right direction that is inherent in the virtual image. Here, the second direction or the left and right direction is a direction corresponding to a scanning direction of the display element 11. The first display device 100A is free of distortion of the virtual image in the first direction through the correction using the prism mirror 22 and the see-through mirror 23. In addition, the remaining distortion inherent in the virtual image is distortion produced by the prism mirror 22 and the see-through mirror 23, and is canceled by the distortion correction with the display control device 88 so as not to be visually recognized by the eyes EY. The projection lens 21 affects the distortion of the virtual image, and the above-described correction is performed in the entire imaging optical system 20 of the first display device 100A.

The display element 11 is a spontaneous light emission type display device. The display element 11 is, for example, an organic electroluminescence (EL) display, and forms a color still image or moving image on a two-dimensional display surface 11a. The display element 11 is disposed along an x-y plane that is inclined by being slightly rotated about the X axis with respect to an X-Y plane. The display element 11 is driven by the display control device 88 that is a control unit to perform a display operation. In the example illustrated in FIG. 2, the display element 11 is arranged upside down with the upper side, in the +y direction, of the display element 11 arranged downward relative to the coordinates of the imaging optical system 20, that is, in the −Y direction. In this case, due to the characteristic of the imaging optical system 20 of the inverted type, the direction of an image displayed on the display element 11 matches that of the display content of the original image before the correction by the display control device 88.

The display element 11 is not limited to the organic EL display, and can be replaced with a display device using inorganic EL, an organic light-emitting diode (LED), an LED array, a laser array, a quantum dot light emission element, or the like. The display element 11 is not limited to a spontaneous light emission type image light generation device, and may include a liquid crystal display (LCD) and another light modulation element, and may form an image by illuminating the light modulation element with a light source such as a backlight. As the display element 11, a liquid crystal on silicon (LCOS) (LCoS is a trade name), a digital micro-mirror device, or the like may be used instead of an LCD.

In the imaging optical system 20, the projection lens 21 includes a first lens 21o, a second lens 21p, and a third lens 21q. The first lens 21o includes an incident surface 21a and an emission surface 21b, the second lens 21p includes an incident surface 21c and an emission surface 21d, and the third lens 21q includes an incident surface 21e and an emission surface 21f. The projection lens 21 receives the image light ML emitted from the display element 11 and makes the image light ML incident on the prism mirror 22. The projection lens 21 focuses the image light ML emitted from the display element 11 into a state close to a parallel luminous flux. The prism mirror 22 includes an incident surface 22a corresponding to an incident portion, an inner reflection surface 22b corresponding to a reflection portion, and an emitting surface 22c corresponding to an emission portion. The prism mirror 22 emits the image light ML incident from the front such that it is bent in a direction inclined with respect to a direction in which an incident direction is reversed (a direction of the light source seen from the prism mirror 22). The see-through mirror 23 includes a reflection surface 23a and an outer side surface 23o. The see-through mirror 23 enlarges an intermediate image formed on the light emission side of the prism mirror 22.

The imaging optical system 20 is an off-axis optical system OS due to the see-through mirror 23 being a concave mirror or due to other like factors. In the case of the present embodiment, the projection lens 21, the prism mirror 22, and the see-through mirror 23 are disposed to be non-axially symmetrical and include an optical surface that is non-axisymmetric. The fact that the imaging optical system 20 is an off-axis optical system OS means that the overall optical path is bent with respect to before and after light rays are incident on a plurality of reflection surfaces or refraction surfaces in the optical elements 21, 22, and 23 constituting the imaging optical system 20. In this imaging optical system 20, that is, the off-axis optical system OS, an optical axis AX is bent so that the optical axis AX extends along an off-axis surface (a surface parallel to a Y-Z plane) corresponding to a plane of the drawing. In this imaging optical system 20, the optical elements 21, 22, and 23 are arranged along the off-axis surface by bending the optical axis AX in the off-axis surface parallel to the Y-Z plane. The optical axis AX of the imaging optical system 20 includes optical axis portions AX1, AX2, and AX3 that are disposed along the off-axis surface (a surface parallel to the Y-Z plane) which is a reference surface extending in the longitudinal direction and are inclined with respect to each other before and after the reflection surface. The optical axis AX as a whole extends along an optical path of the main rays emitted from the center of the display element 11 and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to the inner reflection surface 22b, an optical path P2 from the inner reflection surface 22b to the see-through mirror 23, and an optical path P3 from the see-through mirror 23 to the pupil position PP are bent in a Z shape in two stages. The imaging optical system 20 is arranged vertically. In accordance with this, the off-axis surface (the surface parallel to the Y-Z plane), which is a reference surface, extends parallel to the Y direction, which is a longitudinal direction. In this case, the optical elements 21, 22, and 23 constituting the first display device 100A are arranged so that height positions thereof are changed in the longitudinal direction, and an increase in a transverse width of the first display device 100A can be prevented.

In the imaging optical system 20, the optical path P1 from the projection lens 21 to the inner reflection surface 22b extends upward slightly obliquely or in a direction close to being parallel to the Z direction, toward the backward side from the viewpoint. Thus, in the optical path P1, the optical axis portion AX1 extends in a direction close to the Z axis between the −Z direction and the +Y direction. The optical axis portion AX1 extends in a direction close to the Z axis between the −Z direction and the −Y direction. The optical path P2 from the inner reflection surface 22b to the see-through mirror 23 extends downward obliquely toward the front side. Thus, in the optical path P2, the optical axis portion AX2 extends in a direction close to the middle between the +Z direction and the −Y direction. The optical path P2 is inclined more than the optical path P1 relative to the horizontal direction (X-Z plane). The optical path P3 from the see-through mirror 23 to the pupil position PP extends in the upward direction slightly obliquely or a direction close to being parallel to the Z direction toward the backward side. In the illustrated example, the optical axis portion AX3 is about −10°, where a downward orientation in the +Z direction is negative. That is, an emission optical axis EX that is an extension of the optical axis portion AX3 is inclined downward by about 10° with respect to a center axis HX parallel to the +Z direction on the front side and extends. This is because a line of sight of a human being is stable in a slightly lowered eye state in which the line of sight is inclined downward by approximately 10° with respect to a horizontal direction. The center axis HX that extends in the horizontal direction with respect to the pupil position PP assumes a case in which the wearer US wearing the first display device 100A relaxes in an upright posture and faces the front and gazes at the horizontal direction or the horizontal line.

The incident surface 21a and the emission surface 21b of the first lens 21o forming the projection lens 21 are asymmetrical about the optical axis AX relative to the longitudinal direction, which is parallel to the Y-Z plane and crosses the optical axis AX, and are symmetrical about the optical axis AX relative to the transverse direction or the X direction. The incident surface 21c and the emission surface 21d of the second lens 21p forming the projection lens 21 are asymmetrical about the optical axis AX relative to the longitudinal direction, which is parallel to the Y-Z plane and crosses the optical axis AX, and are symmetrical about the optical axis AX relative to the transverse direction or the X direction. The incident surface 21e and the emission surface 21f of the third lens 21q forming the projection lens 21 are asymmetrical about the optical axis AX relative to the longitudinal direction, which is parallel to the Y-Z plane and crosses the optical axis AX, and are symmetrical about the optical axis AX relative to the transverse direction or the X direction. The first lens 21o, the second lens 21p, and the third lens 21q are formed of a resin for example, but may also be formed of glass. The first and third lenses 21o and 21q may be formed of a resin having a medium refractive index and a high Abbe number, such as cyclic olefin copolymer (COC) and hydrogenated ring-opening polymer (COP), and the second lens 21p may be formed of a resin having a high refractive index and a low Abbe number. With a concave lens having a high refractive index and a low Abbe number provided as the second lens 21p to serve as an achromatic lens, it is possible to suppress chromatic aberration of the imaging optical system 20, whereby optical performance can be largely improved. The incident surface 21a and the emission surface 21b of the first lens 21o are freely-curved surfaces, for example. The incident surface 21a and the emission surface 21b are not limited to freely-curved surfaces, and may be aspherical surfaces. The incident surface 21c and the emission surface 21d of the second lens 21p are freely-curved surfaces, for example. The incident surface 21c and the emission surface 21d are not limited to freely-curved surfaces, and may be aspherical surfaces. The incident surface 21e and the emission surface 21f of the third lens 21q are freely-curved surfaces, for example. The incident surface 21e and the emission surface 21f are not limited to freely-curved surfaces, and may be aspherical surfaces. An aberration reduction can be achieved by setting the incident surfaces 21a, 21c, 21e and the emission surfaces 21b, 21d, 21f to be freely-curved surfaces or aspherical surfaces, and, particularly when a freely-curved surface is used, and because the optical performance of an eccentric system is easily improved, an aberration of the imaging optical system 20, which is a non-coaxial off-axis optical system OS, can be easily reduced. Although detailed illustration is omitted, an antireflection film is formed at the incident surfaces 21a, 21c, 21e and the emission surfaces 21b, 21d, 21f.

The prism mirror 22 is an optical member having a refractive and reflection function that is a function of combining a mirror and a lens, and reflects the image light ML from the projection lens 21 while refracting it. More specifically, in the prism mirror 22, the image light ML enters the inside via the light incident surface 22a, is totally reflected in a non-forward direction by the inner reflection surface 22b, and is emitted to the outside via the emitting surface 22c. The incident surface 22a and the emitting surface 22c are optical surfaces formed of curved surfaces, and contribute to resolution improvement compared to a case in which they are only reflection surfaces or they are flat surfaces. The incident surface 22a, the inner reflection surface 22b, and the emitting surface 22c, which are optical surfaces forming the prism mirror 22, are asymmetrical about the optical axis AX relative to the longitudinal direction, which is parallel to the Y-Z plane and crosses the optical axis AX, and are symmetrical about the optical axis AX relative to the transverse direction or the X direction. The prism mirror 22 may be formed of, for example, a resin, but may also be formed of glass. The prism mirror 22 may be formed of a resin having a medium refractive index and a high Abbe number, such as cyclic olefin copolymer (COC) and hydrogenated ring-opening polymer (COP). A refractive index of a main body of the prism mirror 22 is set to a value such that total reflection on the inner surface is achieved in consideration of a reflection angle of the image light ML. The optical surface of the prism mirror 22, that is, the incident surface 22a, the inner reflection surface 22b, and the emitting surface 22c are, for example, freely-curved surfaces. The incident surface 22a, the inner reflection surface 22b, and the emitting surface 22c are not limited to freely-curved surfaces, and may be aspherical surfaces. In the prism mirror 22, the aberration reduction can be achieved by setting the optical surfaces 22a, 22b, and 22c to be freely-curved surfaces or aspherical surfaces, and, in particular, when a freely-curved surface is used, the optical performance of the eccentric system is easily improved. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed at the inner reflection surface 22b by vapor deposition or the like, or a sheet-shaped reflection film formed of a metal is affixed thereto. Although detailed illustration is omitted, an antireflection film is formed at the incident surface 22a and the emitting surface 22c.

The see-through mirror 23 is a curved plate-shaped reflective optical member that functions as a concave surface mirror, and reflects the image light ML from the prism mirror 22. That is, the see-through mirror 23 reflects, toward the pupil position PP, the image light ML from the prism mirror 22 disposed in an emission region of the projection optical system 12. The see-through mirror 23 covers the pupil position PP at which the eye EY or the pupil is placed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and converges the main rays of the image light ML temporarily spread by imaging in the vicinity of the emission side of the prism mirror 22 of the projection optical system 12, which are the main rays of the image light ML emitted from each of points on the display surface 11a, at the pupil position PP. The see-through mirror 23 is a mirror plate having a structure in which a transmissive mirror film 23c is formed at a front surface or a back surface of a plate-shaped body 23b. The reflection surface 23a of the see-through mirror 23 is asymmetrical about the optical axis AX relative to the longitudinal direction, which is parallel to the Y-Z plane and crosses the optical axis AX, and is symmetrical about the optical axis AX relative to the transverse direction or the X direction. The reflection surface 23a of the see-through mirror 23 is, for example, a freely-curved surface. The reflection surface 23a is not limited to a freely-curved surface, and may be an aspherical surface. The aberration reduction can be achieved by setting the see-through mirror 23 to be a freely-curved surface or an aspherical surface, and, in particular, when a freely-curved surface is used, the aberration of the imaging optical system 20, which is the off-axis optical system OS or a non-coaxial optical system, can be easily reduced.

The see-through mirror 23 is a transmissive type reflection element that allows transmission of some of light upon reflection, and the reflection surface 23a or the mirror film 23c of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23b supporting the mirror film 23c has a thickness of less than or equal to approximately a few millimeters, a change in magnification of the outside image can be curbed to be small. A reflectance of the mirror film 23c with respect to the image light ML and the outside light OL is set to 10% or more and 50% or less in a range of an incident angle of the assumed image light ML from the viewpoint of ensuring a brightness of the image light ML and facilitating observation of the outside image by see-through. The plate-shaped body 23b which is a base material of the see-through mirror 23 is formed of, for example, a resin, and may also be formed of glass. The plate-shaped body 23b is formed of the same material as a support plate 61 that supports the plate-shaped body 23b from the surrounding thereof, and has the same thickness as the support plate 61. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection film is formed at the outer surface 23o of the plate-shaped body 23b.

In describing the optical path, the image light ML from the display element 11 is emitted from the projection lens 21 in a state in which it is incident on the projection lens 21 and is substantially collimated. The image light ML that has passed through the projection lens 21 is incident on the prism mirror 22, passes through the incident surface 22a while being refracted by it, is reflected by the inner reflection surface 22b with a high reflectance close to 100%, and is refracted again by the emitting surface 22c. The image light ML from the prism mirror 22 is incident on the see-through mirror 23 and is reflected by the reflection surface 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the first display device 100A can observe a virtual image of the image light ML in a state in which it overlaps the outside image.

Figure 3:
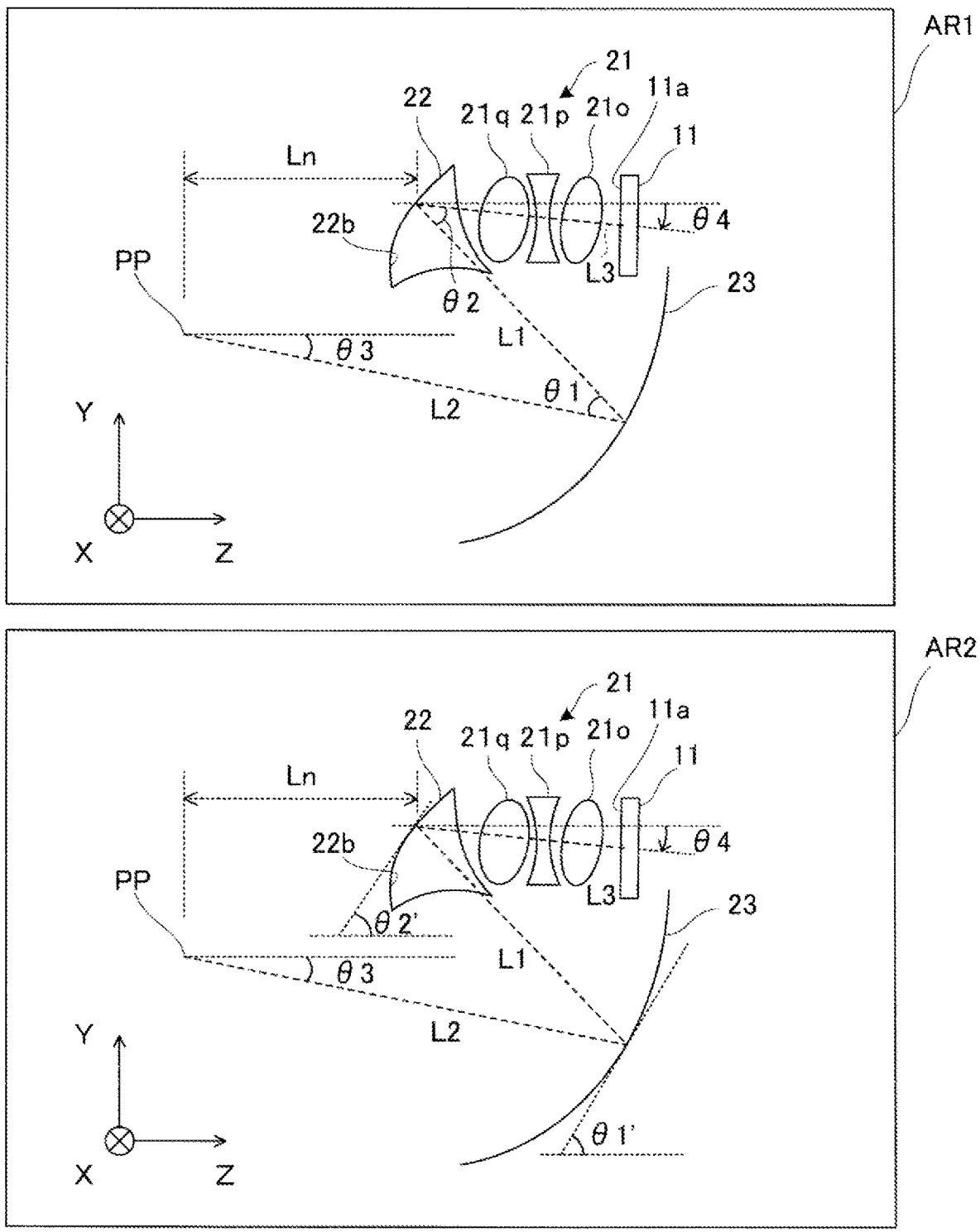
FIG. 3 is a schematic view illustrating an example of arrangement of an optical system of the head-mounted display apparatus.

FIG. 3 is a schematic view illustrating an example of arrangement of the imaging optical system 20 of the first display device 100A. In FIG. 3, a drawing area AR1 illustrates an example of the arrangement focusing on the reflection angle of the optical axis AX of the prism mirror 22 or the see-through mirror 23, and a drawing area AR2 illustrates an example of the arrangement focusing on the inclination of the prism mirror 22 or the see-through mirror 23 with respect to the horizontal axis or Z axis.

In the drawing area AR1 in FIG. 3, an angle θ1 is an angle formed between the image light ML incident on the see-through mirror 23 from the prism mirror 22 and the image light ML reflected to the pupil position PP by the see-through mirror 23. An angle θ2 is an angle formed between the image light ML incident on the inner reflection surface 22b, which is the reflection portion of the prism mirror 22, and the image light ML reflected by the inner reflection surface 22b. An angle θ3 is an angle formed between the horizontal direction or the Z direction and the image light ML reflected to the pupil position PP by the see-through mirror 23. An angle θ4 is an angle formed between the horizontal direction or the Z direction and the image light ML incident on the inner reflection surface 22b of the prism mirror 22. The angle θ4 is approximately an inclination of the image light ML emitted to the display element 11 with respect to the horizontal direction. Reference numeral L1 denotes the optical path length of the image light ML incident on the see-through mirror 23 from the inner reflection surface 22b of the prism mirror 22. Reference numeral L2 denotes the optical path length of the image light ML reflected to the pupil position PP by the see-through mirror 23. Reference numeral L3 denotes the optical path length of the image light ML incident on the inner reflection surface 22b of the prism mirror 22, from the display element 11. Specifically, the optical path length L3 is a distance from the display surface 11a of the display element 11 to the inner reflection surface 22b of the prism mirror 22. For the optical path lengths L1 to L3, a distance can be approximately used.

In the drawing area AR1, the angle θ4 is expressed by the following equation.

$$\theta 4 = -\theta 3 - \theta 1 + \theta 2$$

The lower side and the upper side with respect to the horizontal axis or the horizontal direction respectively correspond to the negative and the positive sides of the angle θ4. The lower side with respect to the horizontal axis corresponds to the positive side of the angle θ3. The angles θ1 and θ2 are absolute values.

A distance Ln from the pupil position PP to the prism mirror 22 in the horizontal direction satisfies the following equation.

$$Ln = L2 \cos\theta 3 - L1 \cos(\theta 3 + \theta 1)$$

Here, the distance Ln is a horizontal distance from the pupil position PP to the prism mirror 22, and is also referred to as an eye relief length. The angle θ3 defines the position of the video center or the image center with respect to the horizontal line of sight (line of sight in the horizontal direction), which may be on the lower side with respect to the horizontal line of sight at the time of video viewing. Specifically, the angle θ3 may be 5° to 20° below the horizontal axis at the time of video viewing. A value θ3+θ1 in the equation corresponds to the angle of L1 with respect to the horizontal axis.

The variables are in the following ranges:
10°≤θ1≤70°
30°≤θ2≤90°
−10°≤θ4≤+10°
15 mm≤Ln≤30 mm
0.5≤L1 cos(θ3+θ1)/L3 cos θ4≤1.5

When the see-through mirror 23 is provided with the angle θ1 being within the range described above, an arrangement angle of the see-through mirror 23 is relatively large, whereby the eccentric aberration can be suppressed. Thus, the optical performance can be improved. Furthermore, a distance between the see-through mirror 23 and the prism mirror 22 can be relatively short. Thus, the imaging optical system 20 can be downsized in the thickness direction, that is, the side cross-sectional direction of the imaging optical system 20. Specifically, with the angle θ1 being not smaller than the lower limit value, the imaging optical system 20 can be prevented from being large on the upper side or the eyebrow side. Furthermore, with the angle θ1 being not larger than the upper limit value, the imaging optical system 20 can be arranged in an appropriate layout.

When the prism mirror 22 is provided with the angle θ2 being within the range described above, an arrangement angle of the prism mirror 22 is relatively large, whereby the imaging optical system 20 can have a small size in the height direction, that is, the vertical direction or the longitudinal direction of the imaging optical system 20. Specifically, with the angle θ2 being not smaller than the lower limit value, the imaging optical system 20 can be arranged in an appropriate layout and can have a small side, and the eccentric aberration can be suppressed. Furthermore, with the angle θ2 being not larger than the upper limit value, the imaging optical system 20 can be arranged in an appropriate layout and can have a small size.

When the display element 11 is provided with the angle θ4 being within the range described above, the eccentric aberration can be suppressed, whereby the optical performance can be improved. Specifically, with the angle θ4 being not smaller than the lower limit value, the imaging optical system 20 can be arranged in an appropriate layout and the eccentric aberration can be suppressed. With the angle θ4 being not larger than the upper limit value, the imaging optical system 20 can have a small size and the eccentric aberration can be suppressed. In particular, with the angle θ4 being an angle of downward inclination, the eccentric aberration can be further suppressed. With the angle θ4 being close to zero, the imaging optical system 20 can have an even smaller size, enables easier general designing, and contributes to sharp looks of the wearer US wearing the product.

With the distance Ln from the pupil position PP to the prism mirror 22 being not smaller than the lower limit value, the virtual image can be completely viewed even when the wearer US is separately wearing glasses. Furthermore, with the distance Ln being not larger than the upper limit value, the imaging optical system 20 can have a small size.

With the value L1 cos(θ3+θ1)/L3 cos θ4 being not smaller than the lower limit value, the imaging optical system 20 can be arranged in an appropriate layout even if there is a plurality of projection lenses 21 for example. The upper limit value of the value L1 cos(θ3+θ1)/L3 cos θ4 is, for example, a limit value of the size of the imaging optical system 20 in the thickness direction when the number of projection lenses 21 is about one.

In the drawing area AR2 in FIG. 3, θ1' denotes an arrangement angle of the see-through mirror 23. Furthermore, θ2' denotes an arrangement angle of the reflection portion of the prism mirror 22. Other angles and optical path lengths are the same as those in the drawing area AR1.

In the drawing area AR2, the angle θ4 is expressed by the following equation.

$$\theta 4 = -\theta 3 - 2\theta 1' + 2\theta 2'$$

The lower side and the upper side with respect to the horizontal axis or the horizontal direction respectively correspond to the negative and the positive sides of the angle θ4. The lower side with respect to the horizontal axis corresponds to the positive side of the angle θ3. The lower side with respect to the horizontal axis corresponds to the positive side of the angles θ1' and θ2'.

The distance Ln from the pupil position PP to the prism mirror 22 in the horizontal direction is expressed by the following equation.

$$Ln = L2 \cos θ3 - L1 \cos(180 - θ3 - 2 θ1')$$

A value 180−θ3−2θ1' in the equation corresponds to the angle of L1 with respect to the horizontal axis.

The variables are in the following ranges:

45°≤θ1'≤75θ
−10°≤θ4+10°
15 mm≤Ln≤30 mm
0.5≤L1 cos(180−θ3−2 θ1')/L3 cos θ4≤1.5

First Example

Specific numerical examples of the variables are listed below.

θ1=28° (θ1'=63°)
θ2=52° (θ2'=67°)
θ3=120
θ4=−40
L1=35 mm
L2=52 mm
L3=26 mm
Ln=26 mm
L1 cos(θ3+θ1)/L3 cos θ4=1.01

In the first display device 100A described above, the reflection angle θ1 or the arrangement angle θ1' of the see-through mirror 23 is set to be relatively large, to control the position of the intermediate image with the inclination angle of the see-through mirror 23 being larger than that in known devices. Thus, the shape of the intermediate image can be controlled by controlling a main ray angle of a light ray with an angle of view in the longitudinal direction (light ray with the angle of view in the Y direction) to the see-through mirror 23. The variables of the imaging optical system 20 of the first display device 100A are set to be within the ranges described above, to suppress the distortion occurring in the vertical direction or the longitudinal direction corresponding to the first direction. In a known device, for example the see-through mirror 23 is arranged while being inclined with respect to the horizontal axis with the arrangement angle θ1' being about 30° to 40°. In this case, the image light ML is reflected more upwardly. In known devices, the eccentric aberration occurring in the see-through mirror 23 is resolved as follows. Specifically, a distance between the see-through mirror 23 and the prism mirror 22 (a distance between the intermediate image and the reflection surface) is set to be long to adjust the magnification of the intermediate image, and the curvature of the reflection surface is suppressed, whereby the aberration occurring in the reflection surface is reduced. This results in a problem in that the imaging optical system 20 has a large size on the eyebrow side of the wearer US. The size of first display device 100A of the present embodiment on the eyebrow side, that is, the distance between the pupil center and the maximum light ray height of the imaging optical system 20 is about 20 mm, meaning that downsizing of about 10 mm from known devices is achieved. In a known device, the angle θ4, which is the incident angle to the prism mirror 22, is about 30°, resulting in the optical system having a complex housing structure. On the other hand, in the first display device 100A of the present embodiment, the angle θ4 is within ±10°, and may be about 5°. Thus, the case 51 serving as the housing can have improved assemblability and robustness without being too complex.

As described above, in the present embodiment, the see-through mirror 23 is inclined at the angle θ1 or the arrangement angle θ1' in the predetermined range. Thus, in the first display device 100A, distortion in the longitudinal direction is suppressed, and trapezoidal distortion mainly including distortion in the transverse direction occurs.

Figure 4:
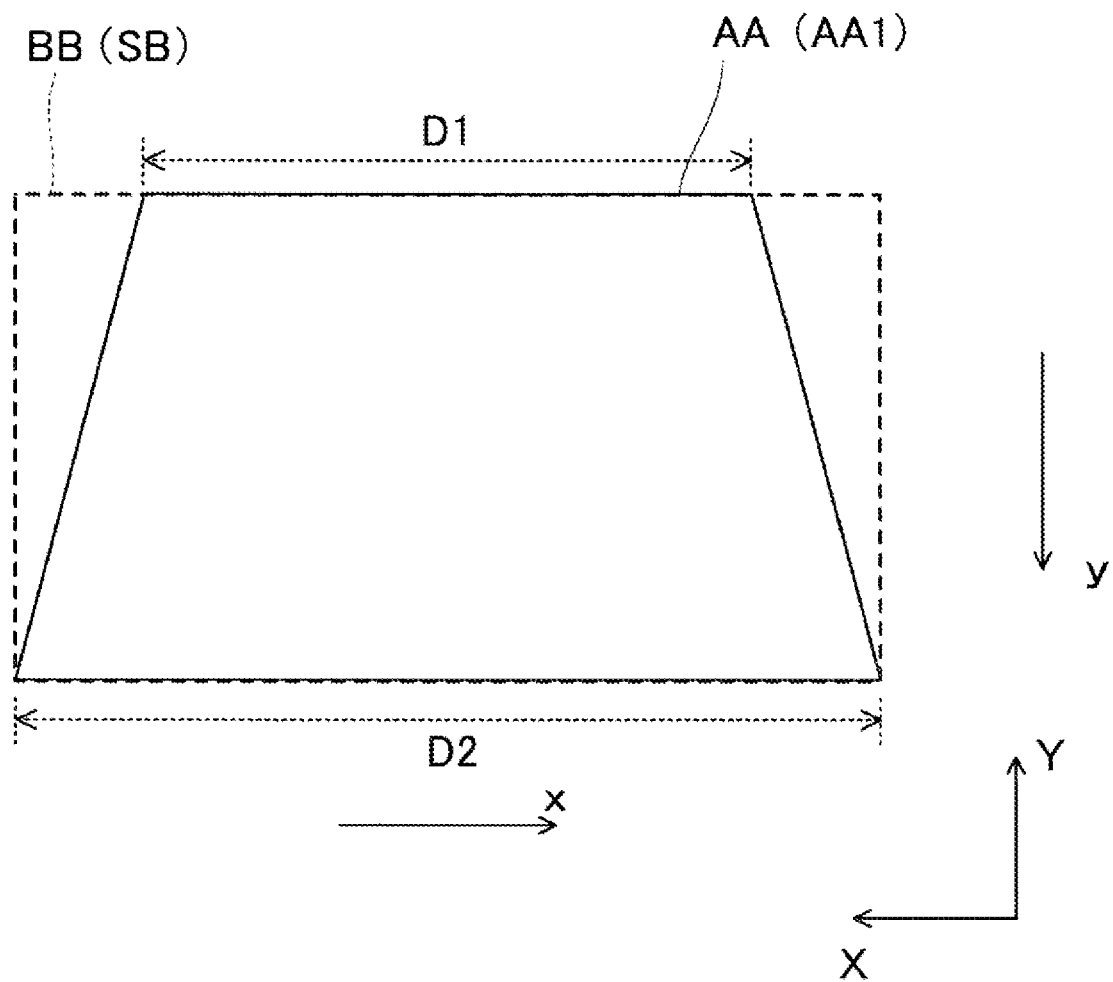
FIG. 4 is a diagram illustrating a virtual image formed on the eye side and an original image displayed on a display element.

FIG. 4 is a virtual view illustrating a virtual image AA formed on the eye EY side and an original image BB displayed on the display element 11, without correction by the display control device 88. In FIG. 4, the solid line illustrates the virtual image AA corrected in the longitudinal direction by the imaging optical system 20 of the first display device 100A, and the dashed line illustrates a display region SB of an ideal rectangular image corresponding to the original image BB.

With the virtual image AA formed in the first display device 100A before the distortion correction with the display control device 88 described below, an image AA1 corresponding to the virtual image AA has a length D1 being shorter than a length D2. The length D1 is a length in the left and right direction corresponding to the second direction on one side in the vertical direction corresponding to the first direction, whereas the length D2 is a length of the image AA1 in the left and right direction on the other side in the vertical direction. For example, assuming that the shape of the image BB before correction is rectangular, the image AA1 after correction has a trapezoidal shape due to correction, by the imaging optical system 20 of the first display device 100A, biased in terms of direction at the time of projection. In the example of FIG. 4, the one side corresponds to the upper side or the +Y direction (corresponding to the −y direction), and the other side corresponds to the lower side or the −Y direction (corresponding to the +y direction). The display control device 88 performs counter distortion correction corresponding to the trapezoidal image AA1, so that the final virtual image after correction can have the same rectangular shape as the original image BB.

Figure 5:
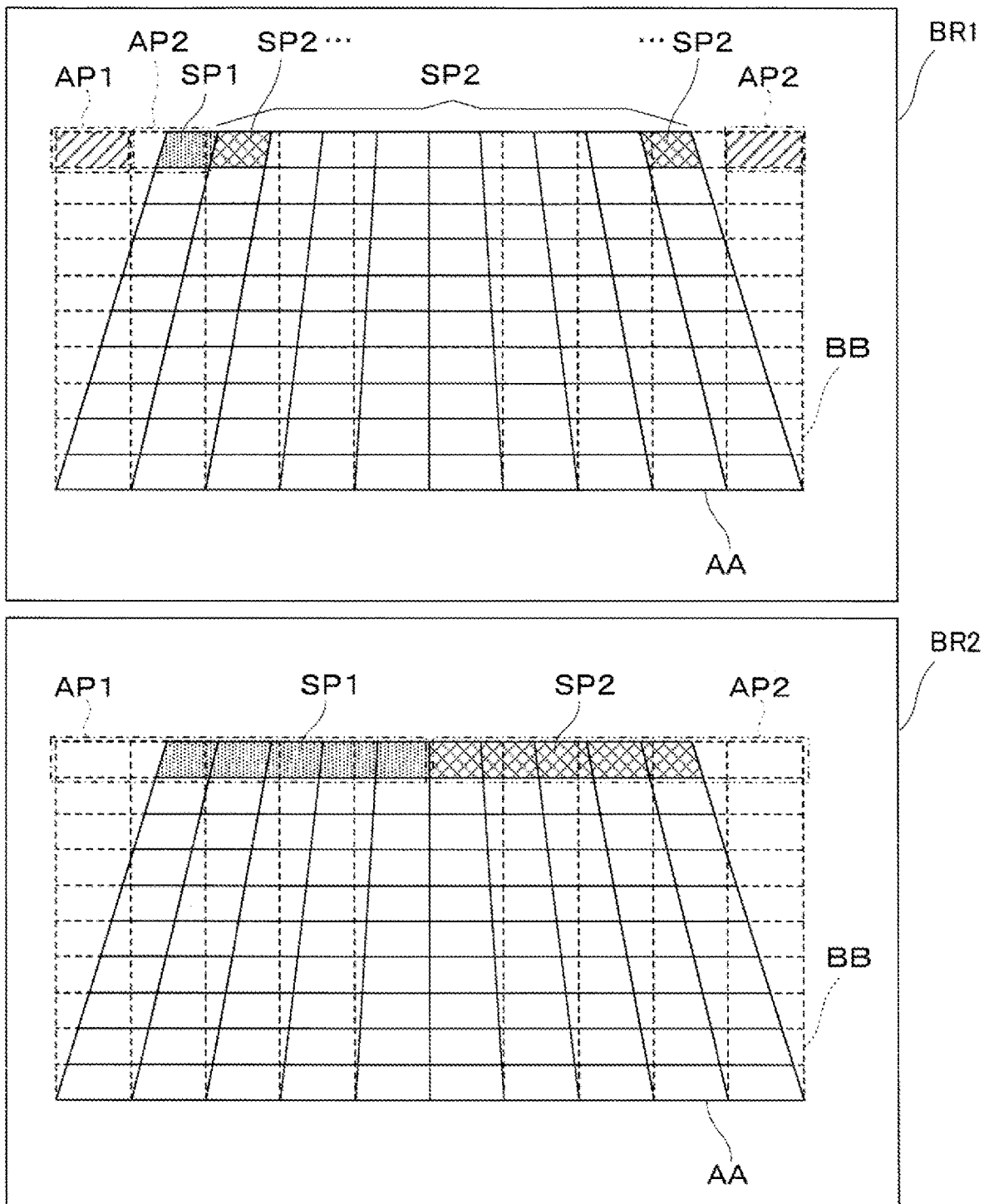
FIG. 5 is a diagram illustrating a distortion state of a virtual image formed by correcting distortion in a vertical direction with the optical system of the head-mounted display apparatus.

FIG. 5 is a diagram illustrating a distortion state of the virtual image AA formed as a result of the correction distortion in the vertical direction by the imaging optical system 20 of the first display device 100A. As illustrated in FIG. 5, the virtual image AA includes a first corrected region SP1 after the correction obtained by correcting a first region AP1 of the original image BB and a second corrected region SP2 after the correction obtained by correcting a second region AP2 of the image before the correction, the second region AP2 and the first region AP1 being arranged side by side in the left and right direction. Each of the first and the second regions AP1 and AP2 is a unit region having a predetermined size.

As can be seen in drawing areas BR1 and BR2 in FIG. 5, the ranges of the first region AP1 and the second region AP2 can be set as appropriate, and the ranges of the first corrected region SP1 and the second corrected region SP2 are determined in accordance with the first region AP1 and the second region AP2. The first region AP1 is a reference region set for each column in the longitudinal direction or each row in the transverse direction. In the example of the drawing area BR1 in FIG. 5, the first region AP1 and the second region AP2 correspond to one of the segments obtained by segmenting the entire pixels of the image BB corresponding to the virtual image AA into 10 by 10 segments in the longitudinal and transverse directions. In this case, when the original image BB has 1920 pixels in the transverse direction and 1080 pixels in the longitudinal direction, one segment has 192×108 pixels. In the example of the drawing area BR2 in FIG. 5, the first region AP1 and the second region AP2 correspond to one of the segments obtained by segmenting the entire pixels of the image BB corresponding to the virtual image AA into 10 segments in the longitudinal direction and 2 segments in the transverse direction. In this case, when the original image BB has 1920 pixels in the transverse direction and 1080 pixels in the longitudinal direction, one segment has 960×108 pixels.

The number of images in the left and right direction in the first corrected region SP1 after the correction is within ±10% of the number of pixels in the left and right direction in the second corrected region SP2 after the correction. In the virtual image AA having the trapezoidal shape in the present embodiment, a distortion interval of the second corrected region SP2 in the transverse direction substantially constantly varies within a range of ±20 pixels from an average value of the lengths of the first and second corrected regions SP1 and SP2 in the transverse direction. The distortion in the transverse direction substantially constantly varies within a range of ±20 pixels in the longitudinal direction of the virtual image AA. The distortion inherent in the imaging optical system 20 of the first display device 100A is corrected by the display control device 88 described below so as to cancel out the distortion.

Figure 6:
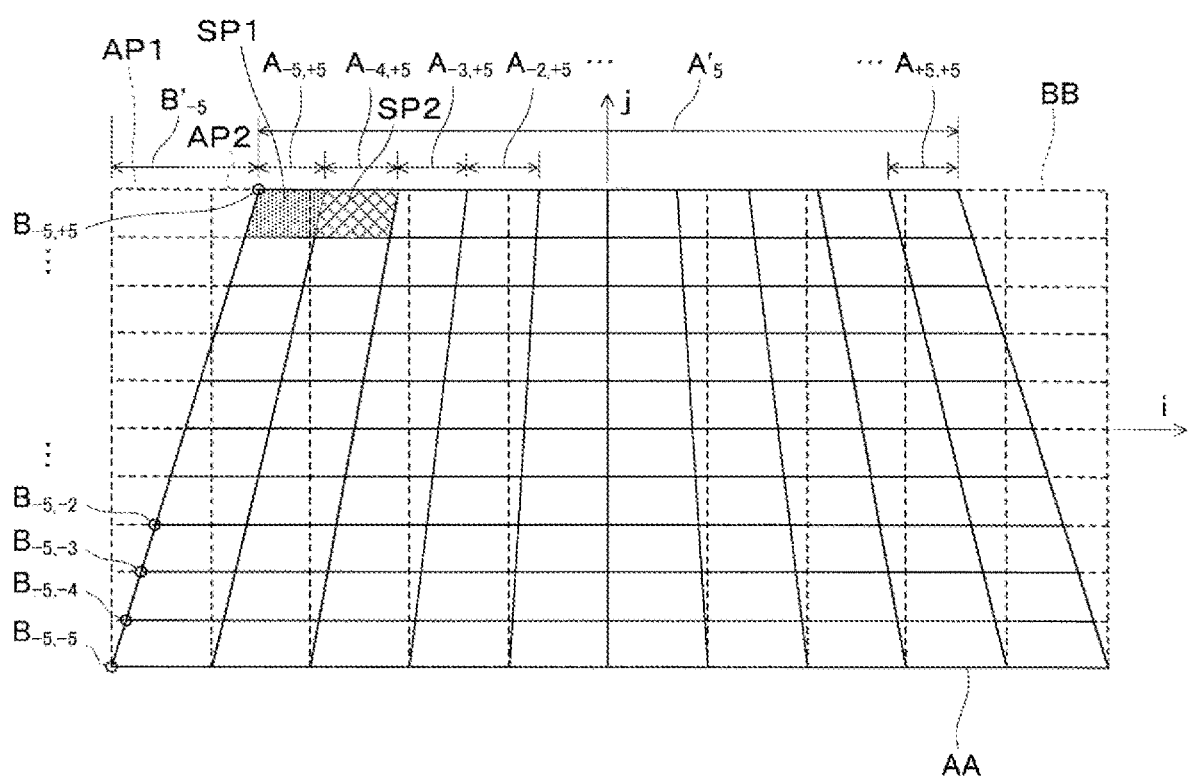
FIG. 6 is a schematic view illustrating a specific example of a distortion state of a virtual image after correction formed with the optical system of the head-mounted display apparatus.

FIG. 6 is a schematic view illustrating a specific example of a distortion state of the virtual image AA after the correction, formed in the imaging optical system 20 of the first display device 100A. As can be seen in the drawing in which the entire pixels of the original image BB corresponding to the virtual image AA are segmented into 10 by 10 segments in the longitudinal and transverse directions, the distortion of the virtual image AA in the transverse direction occurs at an interval $A_{i,j}$ in the first and second corrected regions SP1 and SP2. Sign i indicates a column number, and sign j indicates a row number. The interval $A_{i,j}$ corresponds to a dimension after distortion.

The intervals $A_{i,j}$ are arranged at an equal interval to satisfy the following equations. Assuming that the upper portion of the screen is the fifth row, the first and second corrected regions SP1 and SP2 are arranged at an interval $A_{-5,+5}$ to $A_{+5,+5}$. Under this condition, assuming that the length of the fifth row in the upper part of the screen is $A'_5$, the following equations shall be satisfied.

$$A'_5/10-20 \text{ pix} \leq A_{i,5} \leq A'_5/10+20 \text{ pix}$$

i=−5 to +5

The value 20 pix means 20 pixels.

While the fifth row has been described in the above example, the following equations shall be satisfied for the distortion shape as a whole.

$$A'_j-20 \text{ pix} \leq A_{i,j} \leq A'_j+20 \text{ pix}$$

i=−5 to +5

As illustrated in FIG. 6, $B_{i,j}$ denotes the coordinates of the virtual image AA under the distortion, when the entire pixels of the original image BB corresponding to the virtual image AA are segmented into 10 by 10 segments in the longitudinal and transverse directions. Under this condition, the coordinates of the distortion at the −5th column on the leftmost side are assumed to be $B_{-5,+5}-B_{-5,-5}=B'_{-5}$. The value $B'_{-5}$ is the length in the transverse direction between the coordinates $B_{-5,+5}$ and the coordinates $B_{-5,-5}$, that is, the dimensional difference due to distortion. Under this condition, a length $B_{-5,j}-B_{-5,j-1}$ in the transverse direction between the coordinates of the adjacent rows in the −5th column satisfies the following equations.

$$B'_{-5}/10-20 \text{ pix} \leq B_{-5,j}-B_{-5,j-1} \leq B'_{-5}+20 \text{ pix}$$

j=−5 to +5

While the fifth column has been described in the above example, the following equations shall be satisfied for the distortion shape as a whole.

$$B'_i/10-20 \text{ pix} \leq B_{i,j}-B_{i,j-1} \leq B'_i+20 \text{ pix}$$

j=−5 to +5

Figure 7:
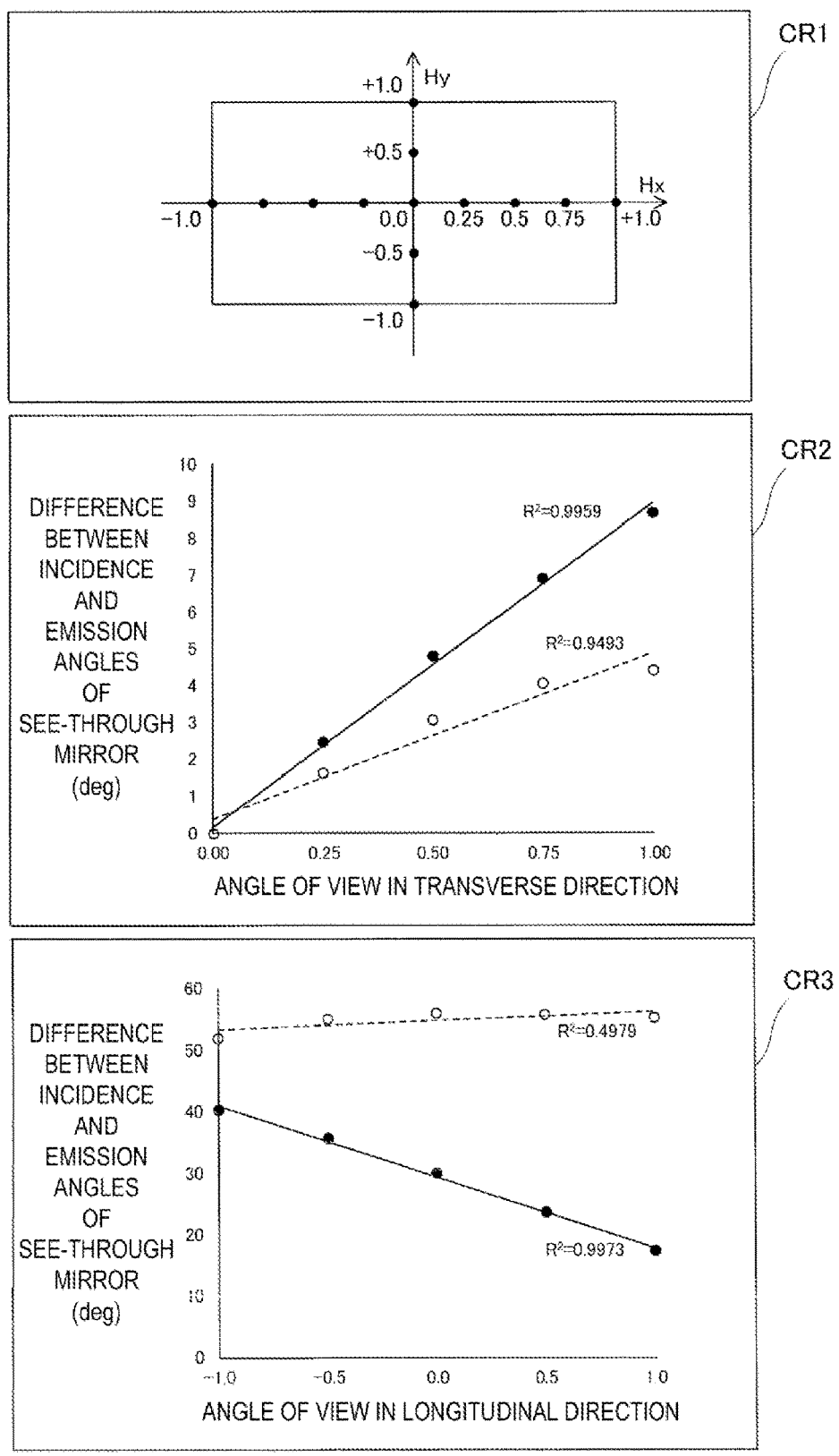
FIG. 7 is a diagram illustrating a relationship between a range of incidence and emission angles of image light of a reflection member, and an angle of view in a transverse direction or a longitudinal direction.

FIG. 7 is a diagram illustrating the relationship between the range of the incidence and emission angles of the image light ML of the see-through mirror 23 and the angle of view in the transverse direction or the longitudinal direction. A drawing area CR1 in FIG. 7 illustrates the screen position where the main ray angle of the imaging optical system 20 of the first display device 100A is examined, and corresponds to the angle of view of the screen or the virtual image. A drawing area CR2 in FIG. 7 indicates a difference between incidence and emission main ray angles in the transverse direction in the see-through mirror 23, and is a drawing plotting a difference between the incidence and emission angles of the see-through mirror 23 relative to the angle of view in the transverse direction. A drawing area CR3 in FIG. 7 indicates a difference between incidence and emission main ray angles in the longitudinal direction in the see-through mirror 23, and is a drawing plotting a difference between the incidence and emission angles of the see-through mirror 23 relative to the angle of view in the longitudinal direction. In the drawing areas CR2 and CR3 in FIG. 7, the solid line indicates the difference plotted with the apparatus of the present embodiment, and the dashed line indicates the difference plotted with a known apparatus. For the approximate lines in the drawing, a determination coefficient $R^2$ is set as an index for the plot linearity. The determination coefficient $R^2$ closer to 1 indicates higher linearity, leading to better fitting. With the determination coefficient $R^2$ set to be closer to 1, the difference between the incidence and emission angles of the see-through mirror 23 constantly varies, and the interval in the longitudinal direction constantly varies. Thus, the shape of the intermediate image can be adjusted so as to eliminate the distortion in the longitudinal direction.

In the present embodiment, the shape of the intermediate image is controlled through the main ray angle control on the light ray with the angle of view in the longitudinal direction and the main ray angle control on the light ray with the angle of view in the transverse direction to the see-through mirror 23. Thus, as illustrated in the drawing areas CR2 and CR3 in FIG. 7, the interval of the distortion in the transverse direction constantly varies, whereby the side shifting in the transverse direction relative to the longitudinal direction is suppressed. As illustrated in the drawing areas CR2 and CR3 in FIG. 7, the difference between the incidence and emission angles of the see-through mirror 23 is nonlinear with the known apparatus, and is linear with the apparatus of the present embodiment. Thus, with the first display device 100A of the present embodiment, the virtual image AA can be prevented from having distortion in the longitudinal direction. With the distortion in the longitudinal direction sufficiently suppressed, no frame buffer memory needs to be secured for the distortion correction with the display control device 88 described below. Thus, it is possible to reduce the calculation load on the display control device 88 for correcting the distortion occurring in the imaging optical system 20. By thus largely reducing the correction load on the circuit in the display control device 88, the power consumption can be much reduced from that with the known apparatus.

In the known apparatus, the see-through mirror 23 is arranged to be inclined with respect to the horizontal axis with the arrangement angle of about 30° to 40° and the distortion in the longitudinal direction occurs. Thus, to correct the distortion in the circuit, a predetermined frame buffer needs to be secured for correction processing by the display control device 88 described below. Thus, there is a problem in that a large amount of power needs to be consumed for memory (nonvolatile memory) maintenance, and that a dedicated IC needs to be developed that enables the distortion to be corrected while enabling the frame buffer for a predetermined amount of pixels to be maintained.

In the present embodiment, the see-through mirror 23 is inclined at a large angle, that is, the arrangement angle of the see-through mirror 23 is set to be large, so that the eccentric aberration can be suppressed, whereby the optical performance can be improved. Furthermore, the reflection angle of the light ray on the see-through mirror 23 for forming the intermediate image is controlled, so that improvement can be achieved regarding the distortion in the longitudinal direction that occurs with the known apparatus. Thus, no frame buffer needs to be maintained, whereby the distortion correction can be performed with an inexpensive integrated circuit such as a general-purpose FPGA in the display control device 88. Furthermore, the power consumption can be reduced.

A circuit system 70 of the HMD 200, that is, the head-mounted display apparatus 100 will be described with reference to FIG. 8. As the circuit system 70, the HMD 200 includes the display control device 88, a pair of the display elements 11, and a user terminal circuit 91. One of the display elements 11 is incorporated in the first display device 100A, and the other one of the display elements 11 is incorporated in the second display device 100B. The display control device 88 functions as a control unit. In the illustrated example, the display control device 88 is illustrated as being incorporated in the first display device 100A, but may be independent of the first display device 100A and the second display device 100B. A combination of one of the first display device 100A and the second display device 100B and the display control device 88 is also referred to as a head-mounted display apparatus 100 and displays a virtual image for one eye.

The display control device 88 includes an arithmetic processing device 81a, a storage device 81m, and a data communication interface 81c.

The storage device 81m stores a program for making the first display device 100A and the second display second display device 100B perform a display operation. The storage device 81m also stores images acquired from the user terminal 90, which is an information terminal, images generated by the arithmetic processing device 81a, and the like. The storage device 81m includes a frame memory 83 that stores image data to be output to the display element 11 corresponding to the image data generated by the arithmetic processing device 81a. The display control device 88 may output the same or different image data to the pair of display elements 11. Processing executed by the one first display device 100A will be described below.

The storage device 81m includes a nonvolatile memory 87 that stores various types of data such as parameters used for calculation for image correction described below.

The display control device 88 makes the display element 11 perform a display operation. The display element 11 includes an auxiliary circuit 85 that is provided in the periphery of the display surface 11a and incorporates a scanning driver and a data driver. When each frame image is displayed, the display control device 88 outputs to the auxiliary circuit 85, a data signal corresponding to the image data stored in the frame memory 83 as well as a timing signal and the like in units of scanning line, and the auxiliary circuit 85 performs rewriting for the display state of the display surface 11a, in accordance with the data signal and the like received from the frame memory 83. The display control device 88 outputs the signal line by line for the image data, and the image is displayed on the display surface 11a of the display element 11 in the scanning direction corresponding to the x direction in FIG. 2. The x direction in FIG. 2 corresponds to the transverse direction or the left and right direction of the display surface 11a. The image data stored in the frame memory 83 is increased line by line in the image of one frame, and is reset after the lines of the entire image are displayed on the display element 11, and the image data of the next frame is stored in the same manner.

The display control device 88 receives display data corresponding to the image data from the user terminal circuit 91 via the data communication interface 81c. The display control device 88 performs distortion correction processing on the display data or the image data acquired from the user terminal circuit 91. The display control device 88 outputs image data, which is the display data after being processed and stored in the frame memory 83, to the display element 11 via the data communication interface 81c.

The imaging optical system 20 illustrated in FIG. 2 is an off-axis optical system OS with the occurrence of distortion in the longitudinal direction suppressed as described above, and thus the imaging optical system 20 has trapezoidal distortion aberration, that is, distortion. To compensate for the distortion, a distortion-corrected non-rectangular contour image needs to be formed at the display surface 11a of the display element 11.

Figure 9:
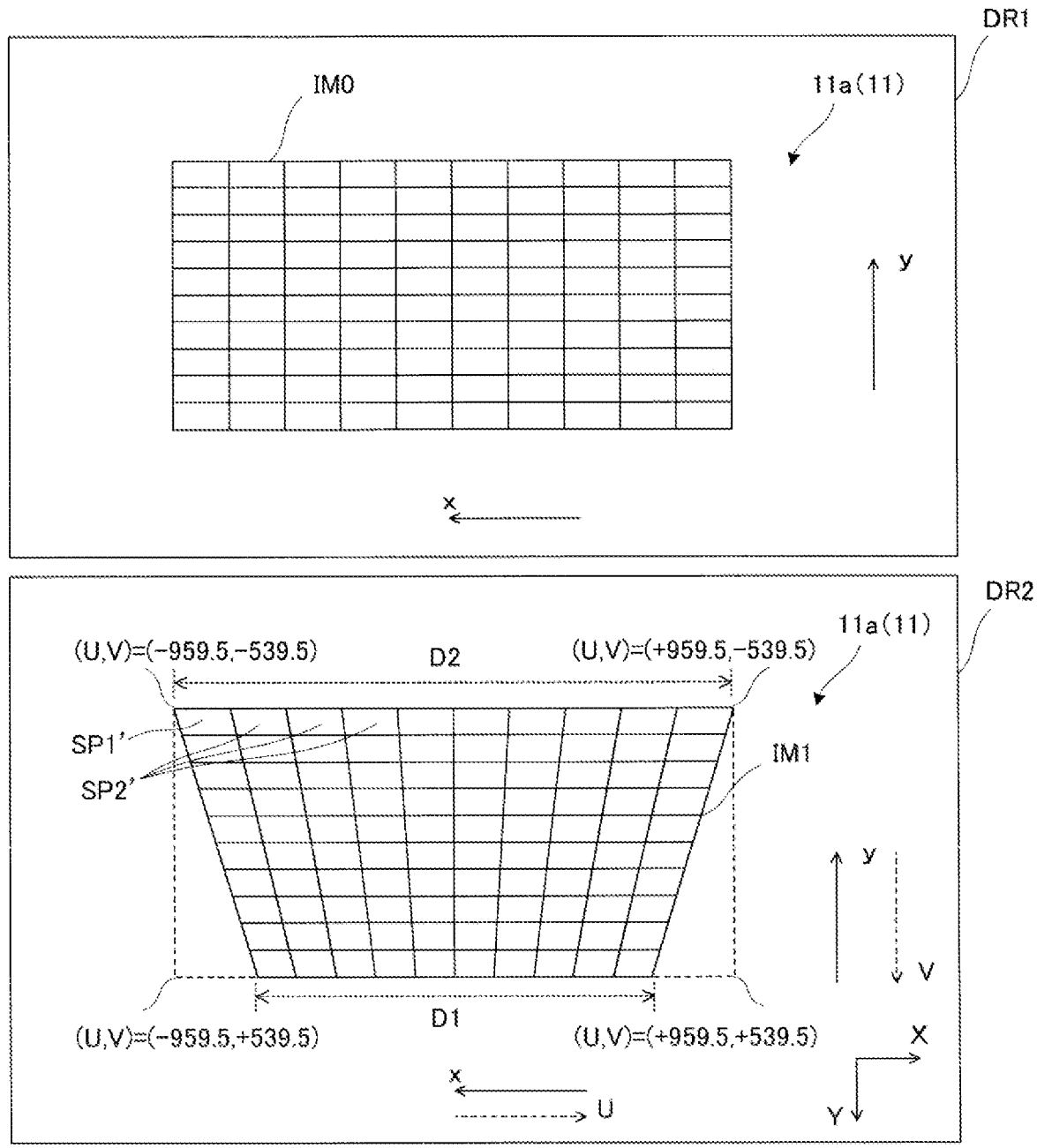
FIG. 9 is a diagram illustrating a coordinate system before distortion conversion and a coordinate system after distortion conversion with a control unit.

FIG. 9 is a diagram illustrating a coordinate system before distortion conversion and a coordinate system after distortion conversion with the display control device 88. A drawing area DR1 in FIG. 9 is a coordinate system in a normal state before the distortion conversion, and illustrates an initial image IM0. A drawing area DR2 in FIG. 9 is a coordinate system in a state of display with the display element 11 after the distortion conversion, and illustrates an altered image IM1. The initial image IM0 is an original display image before the distortion correction with the display control device 88. The altered image IM1 is a display image after the distortion correction with the display control device 88. The altered image IM1 is an image obtained by correcting the distortion occurring in the imaging optical system 20 to form a virtual image with a rectangular shape on the eye EY side.

The display control device 88 performs various types of image processing including calculation processing for distortion correction to convert the initial image IM0 having a rectangular contour corresponding to the input signal from the user terminal circuit 91 as illustrated in FIG. 9, into the altered image IM1 having a non-rectangular contour to be displayed on the display surface 11a.

The arithmetic processing device 81a acquires a video or an image from the user terminal 90 and stores the video or image in the storage device 81m. The image is a display image to be displayed by the head-mounted display apparatus 100, which is specifically the initial image IM0 illustrated in FIG. 9.

Figure 8:
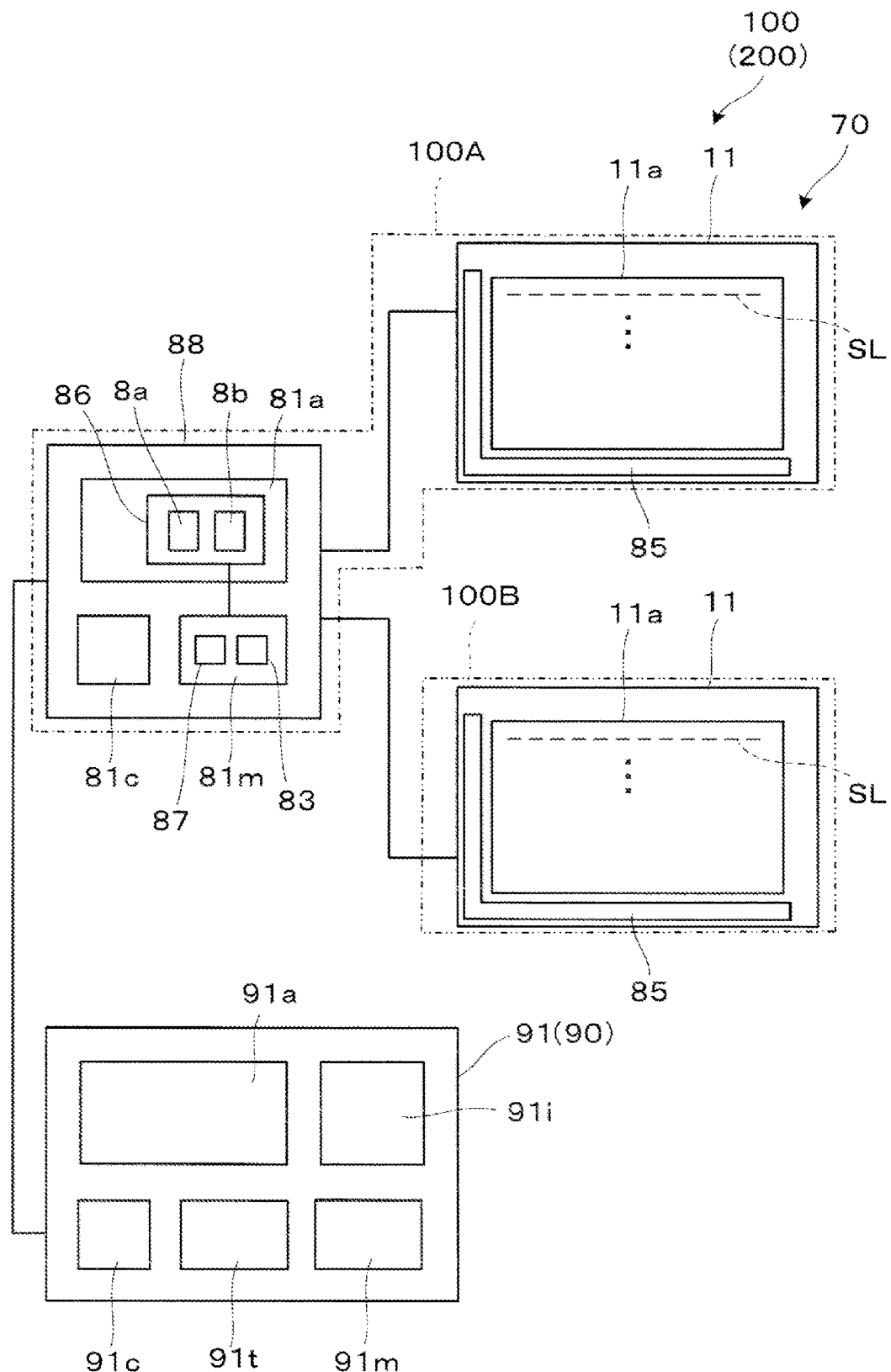
FIG. 8 is a block diagram illustrating a circuit configuration of the head-mounted display apparatus.

As illustrated in FIG. 8, the arithmetic processing device 81*a* includes a correction unit 86 for the distortion correction. The correction unit 86 is a correction circuit that generates a distorted image for canceling out trapezoidal screen distortion occurring in the imaging optical system 20 of the first display device 100A and causes the display element 11 to display the distorted image. With the correction unit 86, the distorted image is generated through simple calculation processing, and a distortion state can be adjusted through parameter adjustment. The correction unit 86 is mounted on, for example, a general-purpose FPGA together with other circuits constituting the display control device 88.

The display control device 88 corrects the image illustrated in the drawing area DR2 in FIG. 9, by making the length D1 of the image in the left and right direction on one side in the vertical direction shorter than the length D2 of the image in the left and right direction on the other side in the vertical direction. As a result, for example, the image before correction assumed to have a rectangular shape turns into an image after the correction, to be displayed with the display element 11, having an inverted trapezoidal shape with a longer length on the upper side. In the example of FIG. 9, the other side is defined as the upper side or the +y direction side, and the one side is defined as the lower side or the −y direction side. The virtual image before the correction displayed using the imaging optical system 20 of the first display device 100A of the present embodiment has a trapezoidal shape. Thus, through the reverse distortion correction by the correction unit 86 as illustrated in the drawing area DR2 in FIG. 9, a rectangular virtual image after correction is obtained.

As in FIG. 5, the corrected image after the image correction with the display control device 88 includes a first corrected region SP1' after the correction (corresponding to the first corrected region SP1 in FIG. 5) as a result of correcting the first region AP1 of the image before the correction, and a second corrected region SP2' after the correction (corresponding to the second corrected region SP2 in FIG. 5) as a result of correcting the second region AP2 of the image before the correction, the second region AP2 and the first region AP1 being arranged side by side in the left and right direction. The number of images in the left and right direction in the first corrected region SP1' after the correction is within ±10% of the number of pixels in the left and right direction in the second corrected region SP2' after the correction. As will be described in detail below, with a relay system of the imaging optical system 20, the image obtained through the optical system is inverted in the vertical and in the left and right direction. Whether the image displayed on the display screen of the display element 11 is rotated depends on the arrangement direction of the display element 11, and thus can be changed as appropriate in accordance with the arrangement direction.

The correction unit 86 of the arithmetic processing device 81*a* includes a coordinate conversion unit 8*a* and a gradation conversion unit 8*b*.

The coordinate conversion unit 8*a* performs correction processing to distort the initial image IM0 as image processing, and stores the distorted altered image IM1 (hereinafter also referred to as distorted initial image IM0) illustrated in FIG. 9 in the storage device 81*m*. The coordinate conversion unit 8*a* corrects the initial image IM0 by distorting the initial image IM0 to counter the distortion caused by the imaging optical system 20 and the like illustrated in FIG. 2. That is, the coordinate conversion unit 8*a* corrects the initial image IM0 to cancel out the distortion in the imaging optical system 20.

The gradation conversion unit 8*b* convers the gradation or the brightness for each pixel corresponding to the coordinates on which the distortion correction is performed by the coordinate conversion unit 8*a*. Specifically, the gradation conversion unit 8*b* adjusts the gradation of the altered image IM1 after the distortion correction, through interpolation.

The processing executed by the coordinate conversion unit 8*a* will be described below. An xy coordinate system in which the center of the video or the image before the distortion conversion is the origin and the size of one pixel is defined as 1 is converted as in the following equation into a UV coordinate system after the distortion conversion.

The coordinate conversion unit 8*a* of the display control device 88 corrects the initial image IM0 to satisfy the following equation:

$$U = ax + bxy$$

where y represents the coordinate of the initial image IM0 before correction in the vertical direction, x represents the coordinate of the initial image IM0 before the correction in the left and right direction, U represents the coordinate of the altered image IM1 after the correction in the left and right direction, a represents the coefficient corresponding to the length of the altered image IM1 after the correction in the left and right direction, and b represents the coefficient corresponding to the angle formed between a vertical direction side and a left and right direction side of the altered image IM1 after the correction.

The coefficient a corresponds to a relative ratio of the original length in the left and right direction. The coefficient b corresponds to the slope of the opposite sides of a trapezoid that are not parallel to each other, i.e., the slope of the legs or meridians of the trapezoid.

Furthermore, the following equation is satisfied:

$$V = y$$

where V represents the coordinate of the altered image IM1 after the correction in the vertical direction.

The coordinate conversion unit 8*a* of the display control device 88 corrects an image to satisfy the following equation:

$$U = ax + bxy + cy$$

where c represents a coefficient corresponding to the distortion of the inclination of the altered image IM1 on one side in the left and right direction and the inclination of the altered image IM1 on the other side in the left and right direction.

The coefficient c corresponds to the imbalance of the inclinations of the opposite sides of a trapezoid that are not parallel to each other, i.e., the imbalance of the inclinations of the legs or meridians of the trapezoid.

The coefficient a, the coefficient b, and the coefficient c described above are rewritable parameters.

Figure 10:
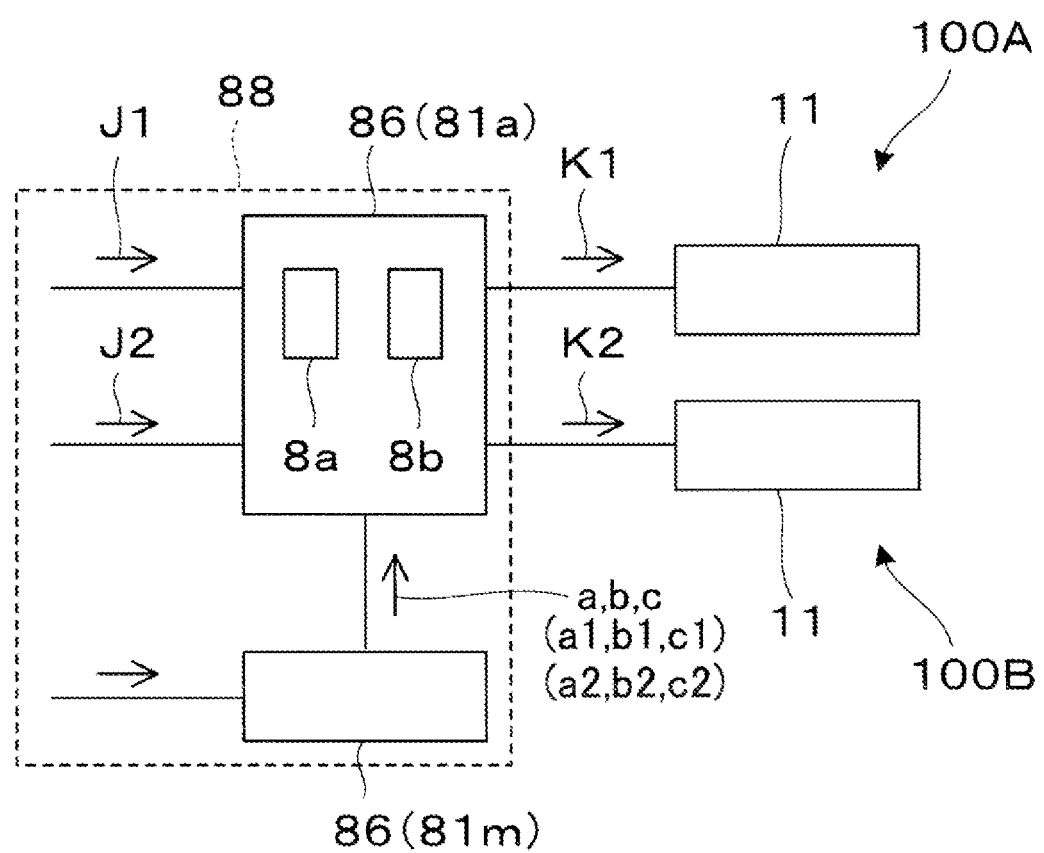
FIG. 10 is a block diagram illustrating part of a display control device and the display element of the head-mounted display apparatus.

FIG. 10 is a block diagram illustrating part of the display control device 88 and the display elements 11 of the first display device 100A. The coordinate conversion unit 8*a* of the correction unit 86 in the drawing receives the image signal of the first display device 100A for the right eye and the image signal of the second display device 100B for the left eye, and performs distortion conversion processing on each of the image signals.

As illustrated in FIG. 10, the coefficients a, b, and c are recorded in the nonvolatile memory 87 that is rewritable from the outside in the storage device 81*m*, and the correction unit 86 acquires the coefficient values recorded in the nonvolatile memory 87 to perform distortion calculation.

Specifically, the coordinate conversion unit 8a of the correction unit 86 receives input signals J1 and J2 respectively of the image signal for the first display device 100A and the image signal for the second display device 100B, and performs calculation processing on the input signals J1 and J2 using different coefficients a1, b1, c1 and a2, b2, c2 to output two output signals K1 and K2 in different distortion states. The correction unit 86 may output two output signals in different distortion states with one input system instead of the two input systems.

The values of the right-eye coefficients a1, b1, and c1 and the left-eye coefficients a2, b2, and c2 are stored in the nonvolatile memory 87, and the calculation processing is executed with the coefficients a1, b1, c1, a2, b2, and c2 acquired at the time of distortion processing by the correction unit 86. Thus, the right-eye and left-eye images can be output in different distortion states. The conversion coefficients recorded in the nonvolatile memory 87 are accessible and rewritable from the outside by a serial communications system such as I2C for example. The correction unit 86 also performs interface conversion for conversion into an image signal suitable for the display element 11. An example of the correction unit 86 actually used includes an FPGA, and a specific example thereof includes LIFCL-17-8MG121C manufactured by Lattice. This FPGA is a chip enabling high speed transmission, and featuring a small footprint (6 mm×6 mm) and small power consumption, but is only capable of performing logical operation of a small scale and thus is limited to simple image processing. Thus, the distortion conversion processing needs to be implementable through a single calculation equation like the one described above.

As illustrated in FIG. 9, the distortion conversion is, for example, an inverse conversion. FIG. 9 illustrates an example of an upside down arrangement of the display element 11 with the upper side provided downward relative to the coordinates of the imaging optical system 20, that is, in the −Y direction. Only trapezoid correction is performed on an image to be displayed on the display screen of the display element 11. Thus, the image is displayed in a trapezoidal shape with an upper side being shorter relative to the coordinates of the imaging optical system 20. In the case of the upside down arrangement, the image that has passed through the imaging optical system 20 is inverted upside down and right side left by a relay system, and the virtual image viewed by the wearer US is subjected to trapezoidal correction, and has directions of the display content matching those of the original image. The distortion conversion may be an upside up conversion, with the display element 11 being in an upside up arrangement to have the upper side provided upward, that is, in the +Y direction with respect to the coordinates of the imaging optical system 20. In this case, the image displayed on the display screen of the display element 11 is subjected to trapezoidal correction, and is displayed while being inverted upside down and right side left. The image that has passed through the imaging optical system 20 is inverted upside down and right side left by a relay optical system, and the virtual image viewed by the wearer US is subjected to trapezoidal correction, and has directions of the display content opposite to those of the original image.

Table 1 illustrates representative values and the number of fixed-point bits used in calculation as specific examples of parameters. In the conversion equation of the present embodiment, the number of times the multiplications is performed is four, which is very small. Thus, the coordinate conversion can be performed with such an extremely simple equation. Thus, distortion conversion processing can be executed with a correction circuit featuring a smaller size, lower power consumption, and lower cost.

TABLE 1

| | | NUMBER OF FIXED-POINT BITS | | |
|---|---|---|---|---|
| ITEM | SIGN | INTEGER PART | DECIMAL PART | ERROR |
| a | 1 | 1 | 16 | 1.0E−05 ←FUNCTION REQUESTED |
| b | 1 | 1 | 34 | 8.0E−12 ←FUNCTION REQUESTED |
| c | 1 | 1 | 16 | 3.0E−06 ←FUNCTION REQUESTED |
| x | 1 | 15 | 2 | |
| y | 1 | 15 | 2 | |
| a*x | 1 | 21 | 14 | |
| x*y | 1 | 21 | 14 | |
| b*xy | 1 | 21 | 14 | |
| c*y | 1 | 21 | 14 | |
| U | 1 | 21 | 14 | 0.0114 |

Representative Value
  a=0.84788
  b=−0.00028791
  c=−0.0055419
Numerical Value Range
  $0.7 \leq a \leq 1$
  $-0.0005 \leq b \leq 0.0005$
  $-0.2 \leq c \leq 0.2$
Function Request
  a) The coefficients a, b, and c of the coordinate conversion calculation equation are common to RGB and can be set separately for the left and right.
  b) The coefficients a, b, and c can be directly adjusted by a command from the correction unit 86. Regardless of whether the data is in the nonvolatile memory 87, the coefficients are used for parameter adjustment after the imaging optical system 20 is incorporated in each display element 11.
  c) As the coefficients a, b, and c, parameters stored in the nonvolatile memory 87 are used. The data is stored in the nonvolatile memory 87 and the coefficients are used after parameter adjustment for each display element 11.
  d) The coefficients a, b, and c used for the conversion can be check from the user terminal 90 through serial communications.
  e) Distortion conversion or display directly can be selected.

Figure 11:
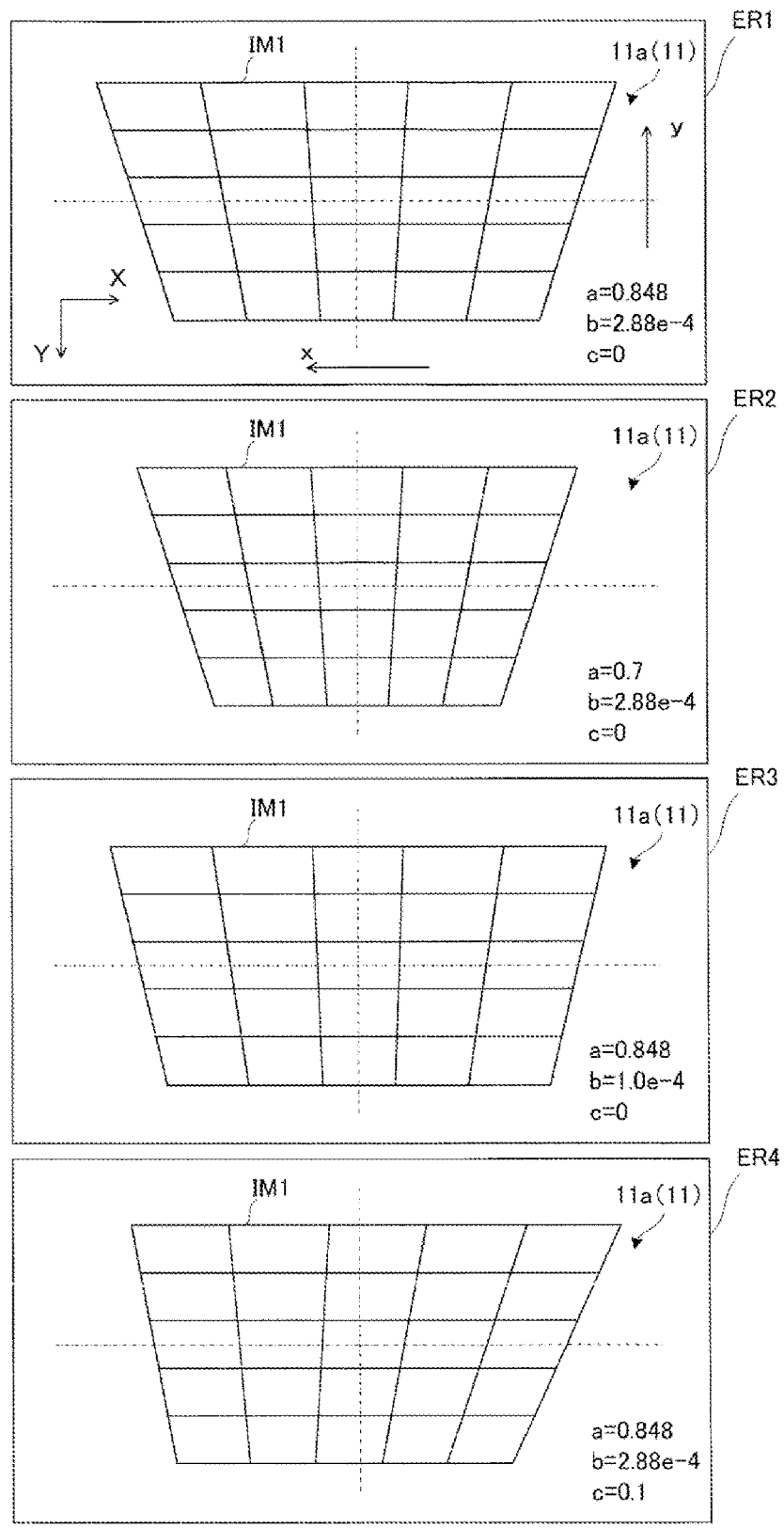
FIG. 11 is a diagram illustrating a distortion state as a result of adjusting parameters at the time of coordinate conversion on an image.

Drawing areas ER1 to ER4 in FIG. 11 are diagrams illustrating a distortion state as a result of adjusting parameters at the time of coordinate conversion on an image. The state of distortion varies depending on the variation of the lenses in the imaging optical system 20. This variation of the distortion due to the variation in the imaging optical system 20 can be corrected by adjusting the coefficients a, b, and c.

When the color image is converted in the coordinate conversion unit 8a, the conversion is performed so that images including respective wavelengths are displayed on the display element 11 as described below.

Figure 12:
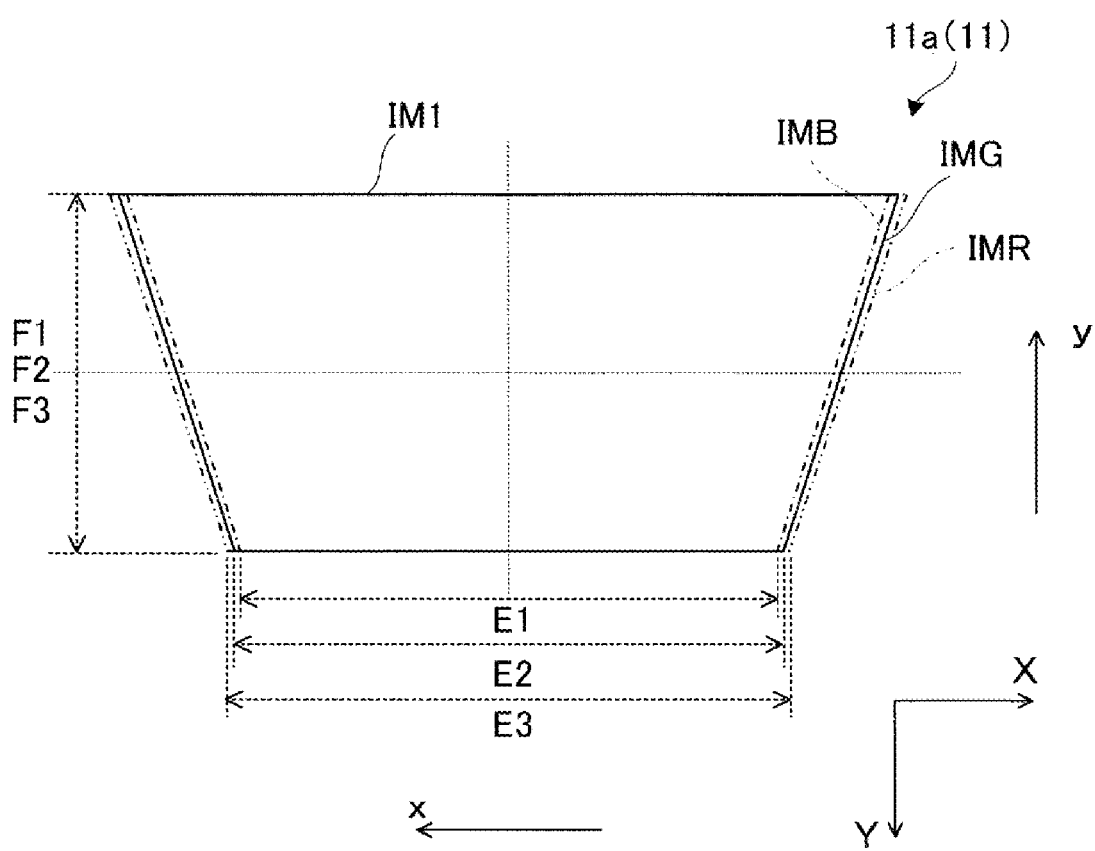
FIG. 12 is a diagram illustrating correction for chromatic aberration in the optical system of the head-mounted display apparatus.

Specifically, as illustrated in FIG. 12, the display element 11 displays a first image IMG including a first wavelength, a second image IMB including a second wavelength that is shorter than the first wavelength, and a third image IMR including a third wavelength that is longer than the first wavelength. In this case, a length E1 of the first image IMG in the left and right direction is a length between a length E2 of the second image IMB in the left and right direction and a length E3 of the third image IMR in the left and right direction. A length F1 of the first image IMG in the vertical direction is the same as a length F2 of the second image IMB in the vertical direction and a length F3 of the third image IMR in the vertical direction. With this configuration, by changing the amount of correction for each wavelength band, the display accuracy of the color image can be improved.

The processing executed by the gradation conversion unit 8b will be described below. The gradation conversion unit 8b performs, for example, linear interpolation.

After the coordinate value as a result of the distortion conversion is obtained, interpolation processing needs to be executed to obtain a gradation value of each pixel of the display element 11. The simplest method to achieve this is nearest neighbor interpolation. Unfortunately, this method, in which the gradation value of the closest coordinate value is used as it is, is likely to result in jagged lines and collapsed characters, when used for displaying straight lines and characters for example. On the other hand, cubic spline interpolation using gradation values of four close points enables a smoother image display, but requires complex calculation processing. In the present embodiment, N-division linear interpolation is performed, with which a gradation value can be obtained by simple calculation processing, based on linear interpolation.

Figure 13:
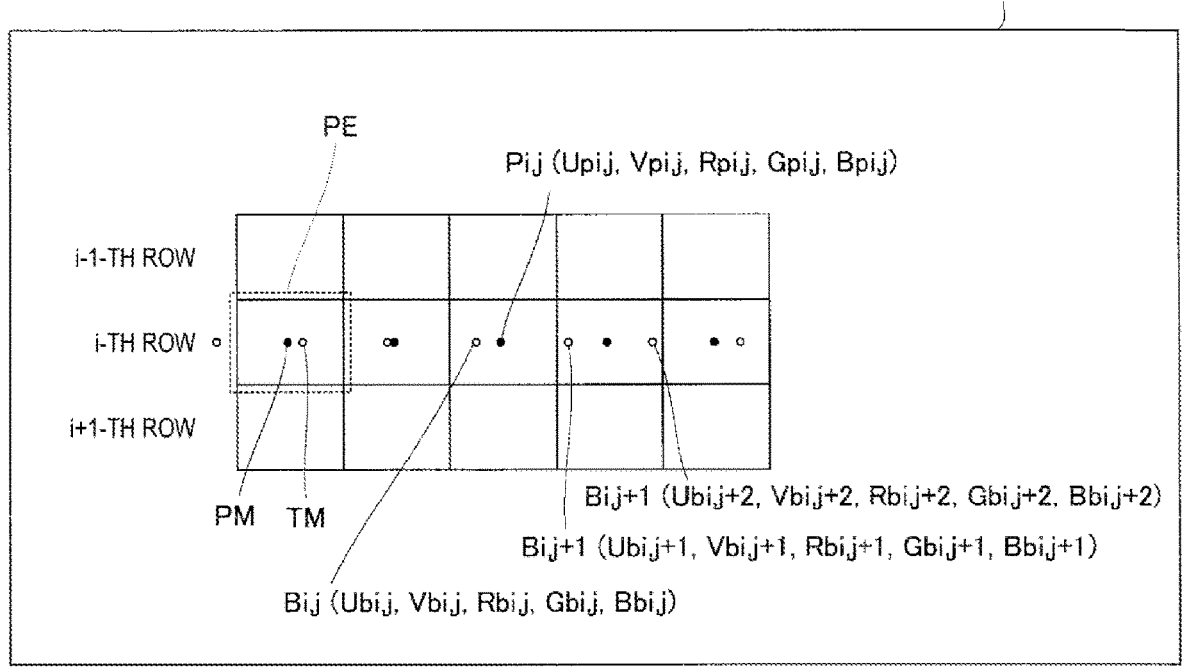
FIG. 13 is a diagram illustrating linear interpolation for image gradation adjustment.
Figure 13:
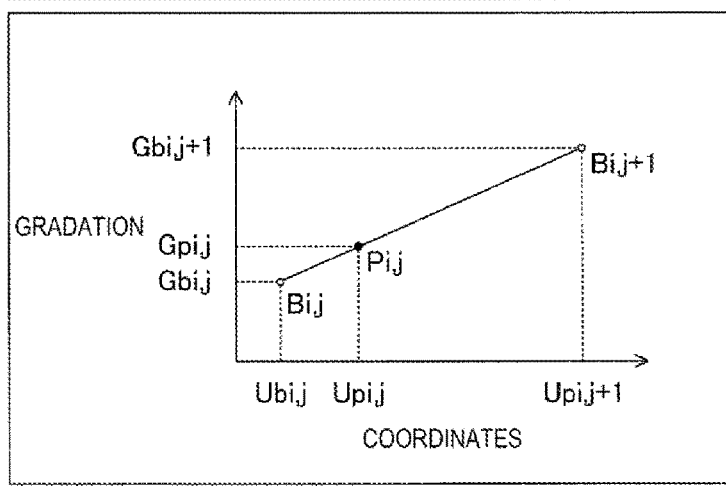

A calculation method used in the linear interpolation will be described below with reference to FIG. 13. A drawing area FR1 in FIG. 13 is a diagram illustrating a relationship between pixel center coordinates PM and converted coordinates TM in a pixel PE in the i-th row of the display element 11. In FIG. 13, a value $Up_{i,j}$ indicates an x coordinate, a value $Vp_{i,j}$ indicates a y coordinate, a value $Rp_{i,j}$ indicates a red gradation value, a value $Gp_{i,j}$ indicates a green gradation value, and a value $Bp_{i,j}$ indicates a blue gradation value. The interpolation calculation is performed for each line and for each wavelength.

A drawing area FR2 in FIG. 13 is a diagram for explaining, for example, the pixel center coordinates PM and the gradation value corresponding to the converted coordinates TM in the green image. As illustrated in the drawing area FR2 in FIG. 13, for a pixel $P_{i,j}$ of the display element 11 that has a gradation value $Gp_{i,j}$ and coordinates ($Up_{i,j}$, $Vp_{i,j}$) and is disposed between two points $B_{i,j}$ and $B_{i,j+1}$ after the distortion conversion with gradation values $Gb_{i,j}$ and $Gb_{i,j+1}$ and coordinates $B_{i,j}$ ($Ub_{i,j}$, $Vb_{i,j}$) and $B_{i,j+1}$ ($Ub_{i,j+1}$, $Vb_{i,j+1}$), the gradation value $Gp_{i,j}$ of the pixel $P_{i,j}$ of the display element 11 is calculated with the following equation.

$$Gp_{i,j}=Gb_{i,j}+\alpha(Gb_{i,j+1}-Gb_{i,j})$$

The value α in the equation is 1 or less.

As described above, the correction unit 86 serving as a distortion producing circuit can execute distortion processing and achieve high image quality with simpler processing, and thus contributes to downsizing, reduction of power consumption, and cost reduction of the circuit.

The user terminal circuit 91 is incorporated in the user terminal 90, and includes a main control device 91a, a storage device 91m, a data communication interface 91c, a mobile body wireless communication device 91t, and a user interface device 91i. The mobile body wireless communication device 91t enables the user terminal circuit 91 to communicate with various devices such as an external server over a communication network (not illustrated). The storage device 91m stores a basic program for operating the user terminal circuit 91, and stores a plurality of application programs including, for example, a viewer for playing a moving image and a web browser as application programs operating on the basic program. The user terminal circuit 91 operates in response to a request from the user interface device 91i operated by the user, and outputs moving images and still images stored in the storage device 91m in association with application programs to the display control device 88 in a predetermined format, or acquires moving images and still images corresponding to various contents via the mobile body wireless communication device 91t and outputs the acquired display data to the display control device 88 in a predetermined format. Although the display control device 88 executes the distortion correction processing on the display data input from the user terminal circuit 91 in the above description, the user terminal circuit 91 may execute the distortion correction processing on the display data.

Figure 14:
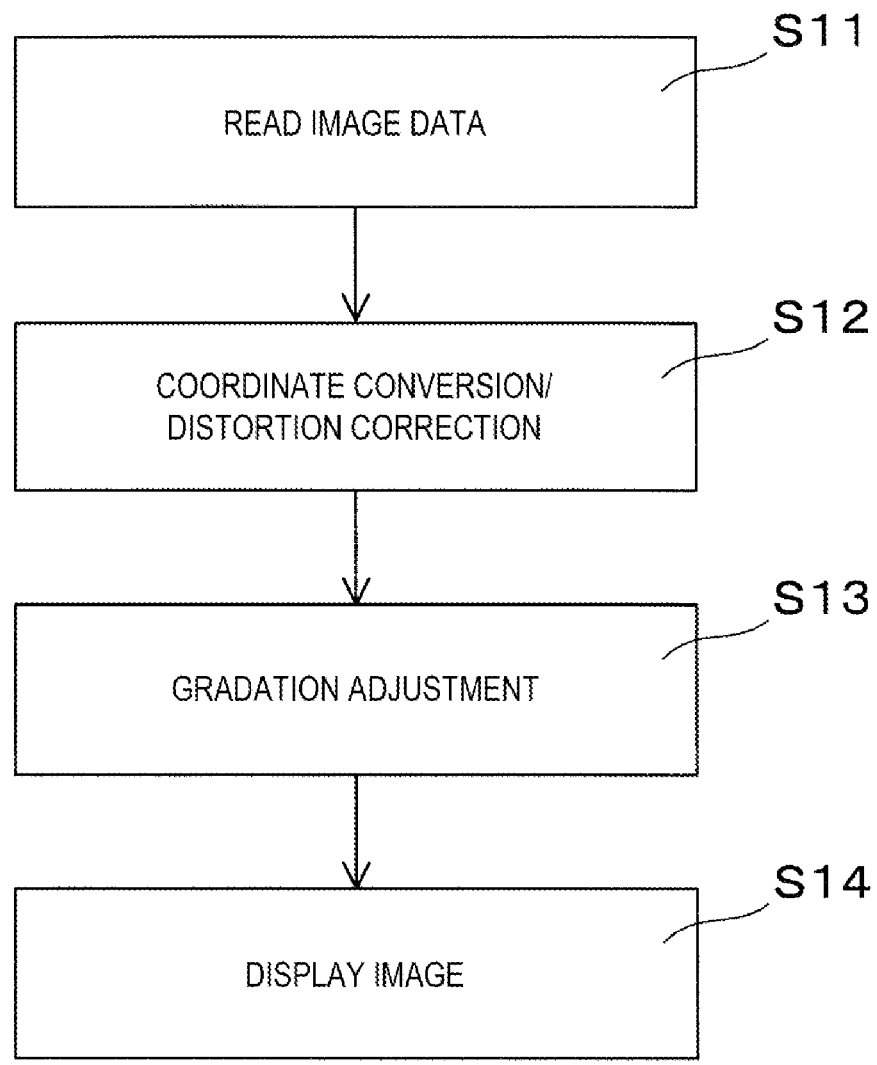
FIG. 14 is a flowchart illustrating image processing in the head-mounted display apparatus.

Image processing for displaying an image on the display surface 11a of the display element 11 will be described below with reference to FIG. 14.

First of all, in the display control device 88 illustrated in FIG. 8, the arithmetic processing device 81a acquires the initial image IM0 as display data from the user terminal 90 via the data communication interface 81c and stores the initial image IM0 in the storage device 81m (step S11). The user terminal circuit 91 outputs moving images and still images stored in the storage device 91m to the display control device 88 in a predetermined format, or outputs moving images and still images acquired via the mobile body wireless communication device 91t to the display control device 88 in a predetermined format.

Next, in the display control device 88, the arithmetic processing device 81a serves as the coordinate conversion unit 8a of the correction unit 86 to perform distortion correction on the initial image IM0 through coordinate conversion (step S12). The coordinate conversion unit 8a performs coordinate conversion on the initial image IM0 to cancel distortion aberration of the imaging optical system 20.

Next, in the display control device 88, the arithmetic processing device 81a serves as the gradation conversion unit 8b of the correction unit 86 to perform gradation adjustment on the initial image IM0 (step S13). The gradation conversion unit 8b executes image processing such as gradation adjustment on the image after the coordinate conversion in step S12 to create the altered image IM1. The altered image IM1 is recorded on a frame-by-frame basis in the frame memory 83 of the storage device 81m.

Finally, in the display control device 88, the arithmetic processing device 81a reads the image data of the altered image IM1 from the frame memory 83 of the storage device 81m line by line, and displays it on the display surface 11a of the display element 11 scanning line SL by scanning line SL as illustrated in FIG. 8 (step S14). The trapezoidal altered image IM1 displayed on the display element 11 is visually recognized as a rectangular image in the virtual image formed through the imaging optical system 20. Since the imaging optical system 20 of the present embodiment forms an intermediate image in between, the virtual image is inverted upside down and right side left with respect to the initial image IM0.

The head-mounted display apparatus 100 of the first embodiment described above includes: a control unit 88 configured to correct a video, the display element 11 configured to display the video corrected by the control unit 88, a first optical member 22 on which video light corresponding to the video is incident, and a reflection member 23 configured to reflect the video light from the first optical member 22 to project a virtual image corresponding to the video, in which the first optical member 22 and the reflection member 23 correct distortion of the virtual image in a first direction, and the control unit 88 corrects the video based on distortion of the virtual image in a second direction crossing the first direction.

In the head-mounted display apparatus 100, the first optical member 22 and the reflection member 23 correct the distortion of the virtual image in the first direction, and the control unit 88 corrects the video based on the distortion of the virtual image in the second direction. With this configuration, the control unit 88 does not need to execute the distortion correction processing according to the distortion of the virtual image in the first direction, and only needs to correct the distortion in one direction. Therefore, it is possible to reduce the load on the control unit 88 related to the video distortion correction.

Second Embodiment

Hereinafter, a head-mounted display apparatus according to a second embodiment of the present disclosure will be described. The head-mounted display apparatus according to the second embodiment is obtained by modifying a part of the head-mounted display apparatus according to the first embodiment, and description of common parts will be omitted.

Figure 15:
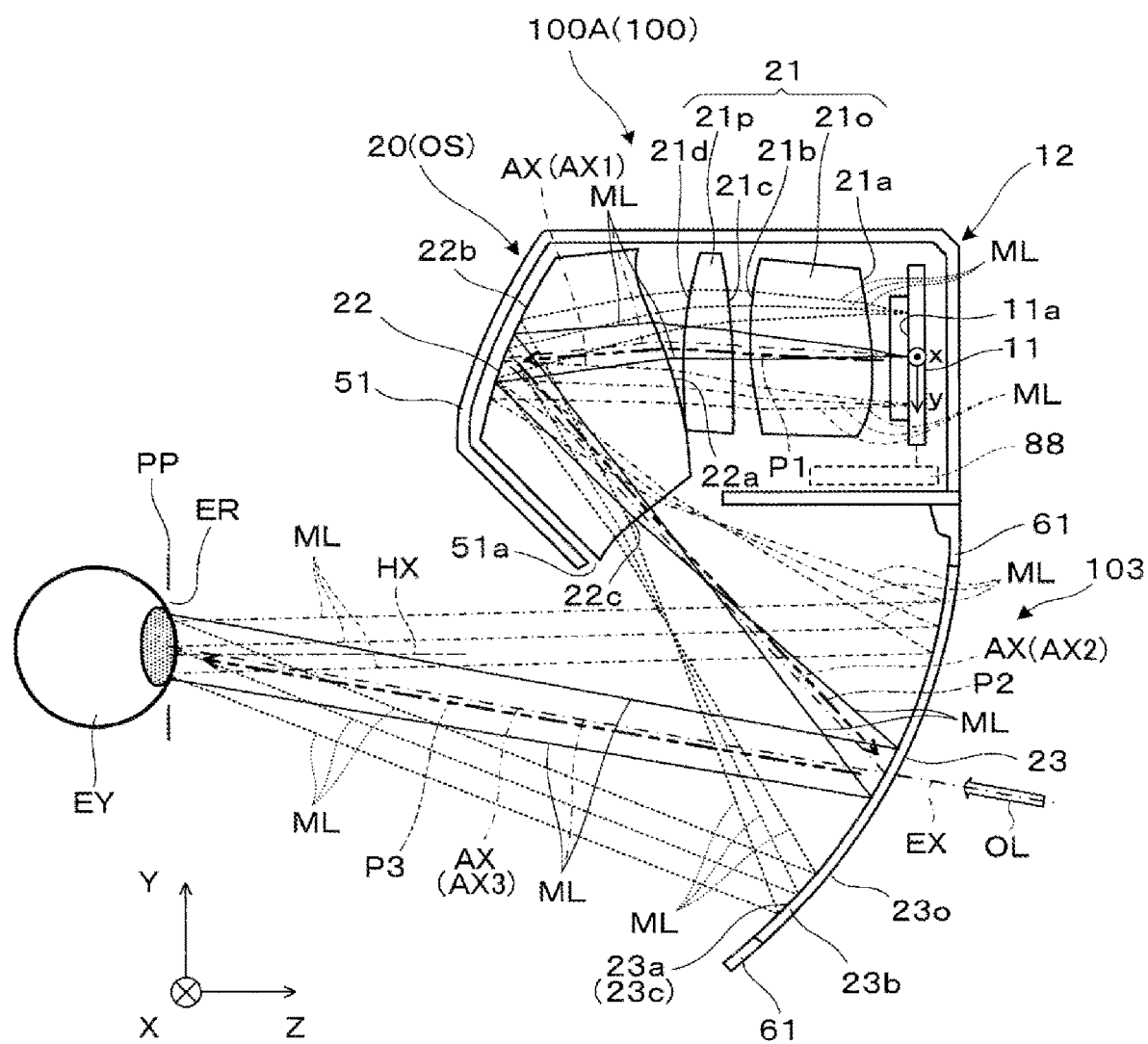
FIG. 15 is a side cross-sectional view illustrating an internal structure of a head-mounted display apparatus according to a second embodiment.

FIG. 15 is a side cross-sectional view illustrating an internal structure of a head-mounted display apparatus 100 according to the second embodiment. As illustrated in FIG. 15, in the head-mounted display apparatus 100 according to the second embodiment, the projection lens 21 is configured by two lenses in the imaging optical system 20 of the first display device 100A. Specifically, the projection lens 21 includes the first lens 21o and the second lens 21p. In the second embodiment, the concave second lens 21p having the achromatic function in the projection lens 21 of the first embodiment illustrated in FIG. 2 is omitted. The angles and arrangement of the optical elements of the imaging optical system 20 are the same as those in the first embodiment. The first lens 21o and the second lens 21p are formed of a resin for example, but may also be formed of glass. In the second embodiment, the first lens 21o and the second lens 21p may be formed of a resin having a medium refractive index and a high Abbe number, such as cyclic olefin copolymer (COC) and hydrogenated ring-opening polymer (COP).

Second Example

Specific numerical examples of the variables are listed below.

Figure 16:
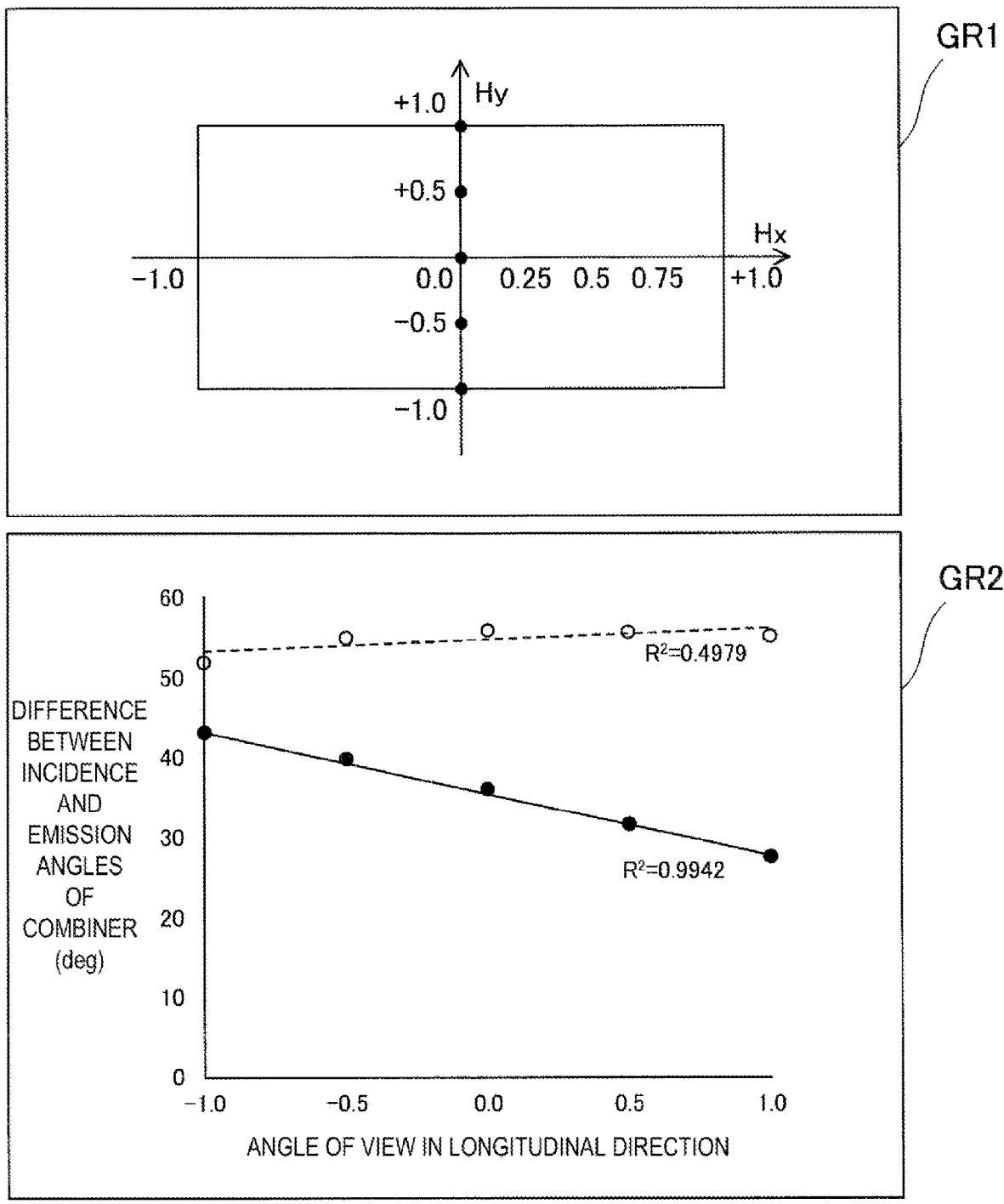
FIG. 16 is a diagram illustrating a relationship between a range of incidence and emission angles of image light of a reflection member, and an angle of view in the longitudinal direction in the head-mounted display apparatus according to the second embodiment.
Figure 17:
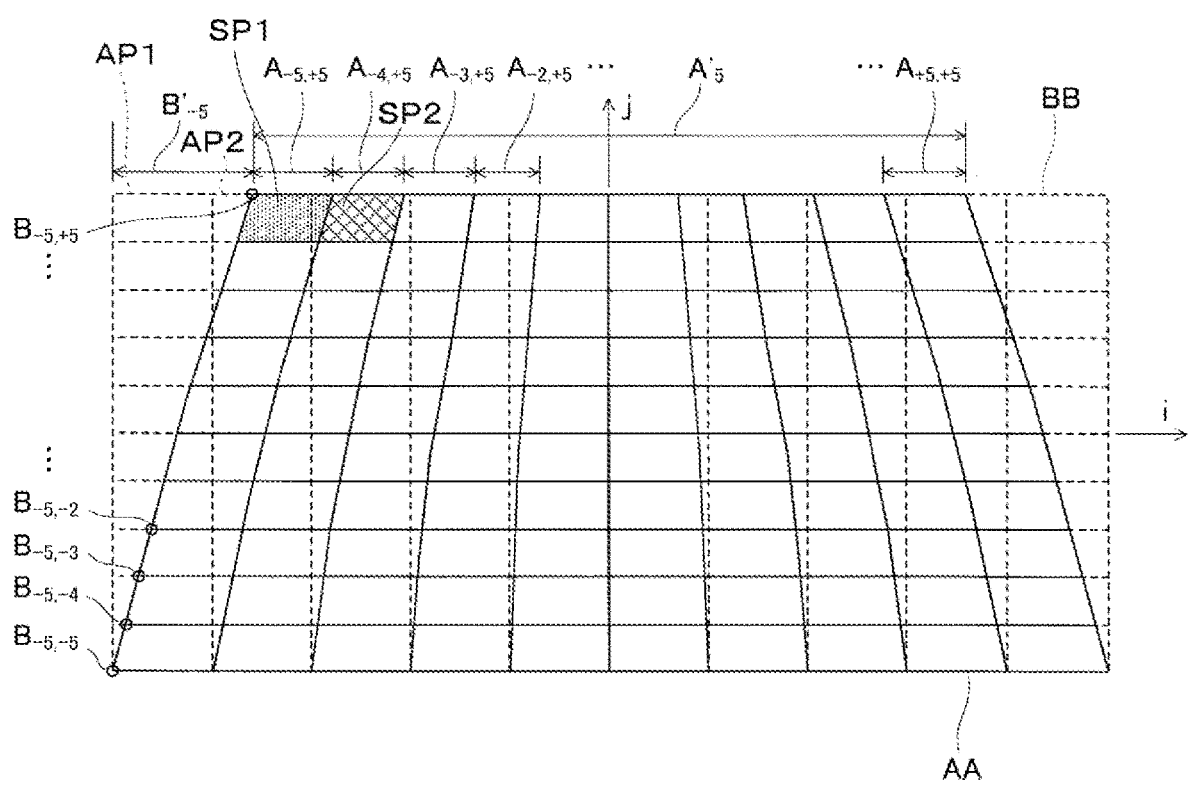
FIG. 17 is a schematic view illustrating a specific example of a distortion state of a virtual image formed with an optical system of the head-mounted display apparatus according to the second embodiment.

$\theta1=36°$ ($\theta1'=62°$)
$\theta2=52°$ ($\theta2'=70°$)
$\theta3=100$
$\theta4=-4°$
$L1=35$ mm
$L2=46$ mm
$L3=26$ mm
$Ln=21$ mm
$L1 \cos(\theta3+\theta1)/L3 \cos \theta4=0.93$ FIG. 16 is a diagram illustrating the relationship between the range of the incidence and emission angles of the image light ML of the see-through mirror 23 and the angle of view in the longitudinal direction. A drawing area GR1 in FIG. 16 illustrates the screen position where the main ray angle of the imaging optical system 20 of the first display device 100A is examined, and corresponds to the angle of view of the screen or the virtual image. A drawing area GR2 in FIG. 16 indicates a difference between incidence and emission main ray angles in the longitudinal direction in the see-through mirror 23, and is a drawing plotting a difference between the incidence and emission angles of the see-through mirror 23 relative to the angle of view in the longitudinal direction. In the drawing area GR2 in FIG. 16, the solid line indicates the difference plotted with the apparatus of the present embodiment, and the dashed line indicates the difference plotted with a known apparatus. FIG. 17 is a schematic view illustrating a specific example of a distortion state of the virtual image AA, formed in the imaging optical system 20 of the first display device 100A of the second embodiment.

In the present embodiment, by controlling the shape of the intermediate image by controlling the main ray angle of the light ray with the angle of view in the longitudinal direction to the see-through mirror 23, it is possible to prevent distortion in the longitudinal direction from occurring in the virtual image AA in the first display device 100A of the present embodiment as illustrated in the drawing area GR2 in FIG. 16 and in FIG. 17. With the distortion in the longitudinal direction suppressed, no frame buffer memory needs to be secured for the distortion correction with the display control device 88. Thus, it is possible to reduce the calculation load on the display control device 88 for correcting the distortion occurring in the imaging optical system 20. By thus largely reducing the correction load on the circuit in the display control device 88, the power consumption can be much reduced from that with the known apparatus.

In the imaging optical system 20 of the second embodiment, as illustrated in FIG. 17, the interval $A_{i,j}$ varies even in the same row and a length $B'_i$ in the transverse direction between the coordinates of the adjacent rows varies even in the same column in the first and second corrected regions SP1 and SP2 of the image because the suppression of the interval of the distortion in the transverse direction and the side shifting in the transverse direction relative to the longitudinal direction is not sufficient as compared with the imaging optical system 20 of the first embodiment.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

The first display device 100A may include an imaging optical system that is asymmetric in the transverse direction, and distortion correction may be asymmetric in the transverse direction, that is, in the X direction. In this case, the first optical member and the reflection member correct the distortion of the virtual image in the left and right direction, and the control unit corrects the video based on the distortion in the vertical direction.

In the first display device 100A, the projection lens 21 includes three or two lenses, but may include one lens or four or more lenses. The projection lens 21 may not be provided in the first display device 100A.

A light control device that controls light by limiting transmitted light of the see-through mirror 23 may be mounted on the outside of the see-through member 23. The light control device adjusts a transmittance, for example, electrically. Mirror liquid crystals, electronic shades, and the like may be used as the light control device. The light control device may adjust a transmittance according to outside light brightness.

In the first display device 100A, a wedge-shaped optical element 28 for improving an imaging state may be provided between the prism mirror 22 and the see-through mirror 23. For example, with the refractive index of the wedge-shaped optical element 28 set to be different from the refractive index of the prism mirror 22 and with the degree of refraction or dispersion adjusted between the wedge-shaped optical element 28 and the prism mirror 22 or the like, achromatism can be easily achieved.

A head-mounted display apparatus of a specific aspect includes a control unit configured to correct a video, a display element configured to display the video corrected by the control unit, a first optical member on which video light corresponding to the video is incident, and a reflection member configured to reflect the video light from the first optical member to project a virtual image corresponding to the video, in which the first optical member and the reflection member correct distortion of the virtual image in a first direction, and the control unit corrects the video based on distortion of the virtual image in a second direction crossing the first direction. Here, through the correction by the first optical member and the reflection member, the head-mounted display apparatus according to the present disclosure is free of distortion of the virtual image in the first direction. The remaining distortion inherent in the virtual image, which is distortion caused by the first optical member and the reflection member, is canceled by the distortion correction in the control unit so as not to be visually recognizable by the eyes.

In the head-mounted display apparatus, the first optical member and the reflection member correct the distortion of the virtual image in the first direction, and the control unit corrects the video based on the distortion of the virtual image in the second direction. With this configuration, the control unit does not need to execute the distortion correction processing according to the distortion of the virtual image in the first direction, and only needs to correct the distortion in one direction. Therefore, it is possible to reduce the load on the control unit related to the video distortion correction.

In a specific aspect, the second direction is a direction corresponding to a scanning direction of the display element.

In a specific aspect, the control unit corrects the video to make a length of the video in the second direction on one side in the first direction shorter than a length of the video in the second direction on another side in the first direction.

In this case, for example, the video before correction assumed to have a rectangular shape turns into the video after the correction, to be displayed with the display element, having a trapezoidal shape.

In a specific aspect, the control unit corrects the video to satisfy the following equation:

$$U=ax+bxy$$

where y represents a coordinate of the video before correction in the first direction, x represents a coordinate of the video before the correction in the second direction, U represents a coordinate of the video after the correction in the second direction, a represents a coefficient corresponding to a length of the video after the correction in the second direction, and b represents a coefficient corresponding to an angle formed between sides of the video after the correction in the first direction and the second direction.

In a specific aspect, the control unit corrects the video to satisfy the following equation:

$$U=ax+bxy+cy$$

where c represents a coefficient corresponding to distortion of inclination of the video after the correction on one side in the second direction and inclination of the video after the correction on another side in the second direction.

In a specific aspect, the coefficient a, the coefficient b, and the coefficient c are rewritable parameters.

In a specific aspect, the display element displays a first video including a first wavelength, a second video including a second wavelength shorter than the first wavelength, and a third video including a third wavelength longer than the first wavelength, a length of the first video in the second direction is a length between a length of the second video in the second direction and a length of the third video in the second direction, and a length of the first video in the first direction is the same as a length of the second video in the first direction and a length of the third video in the first direction. With this configuration, by changing the amount of correction for each wavelength band, the display accuracy of the color image can be improved.

In a specific aspect, the video after the correction includes a first corrected region after the correction obtained by correcting a first region of the video before the correction and a second corrected region after the correction obtained by correcting a second region of the video before the correction, the second region and the first region being arranged side by side in the second direction, and the number of images in the second direction in the first corrected region after the correction is within ±10% of the number of pixels in the second direction in the second corrected region after the correction.

In a specific aspect, the reflection member is provided with an angle θ1, formed between the video light incident on the reflection member from the first optical member and the video light reflected to a position of a pupil by the reflection member, satisfying 10°≤θ1≤70°. In this case, by setting the arrangement angle of the reflection member to be relatively large with the angle θ1 being within the range described above, the eccentric aberration can be suppressed, whereby the optical performance can be improved. Furthermore, a distance between the reflection member and the first optical member can be relatively short. Thus, the optical system can be downsized in the thickness direction, that is, the side cross-sectional direction of the optical system.

In a specific aspect, the first optical member includes an incident portion on which the video light from the display element is incident, an emission portion from which the incident video light is emitted toward the reflection member, and a reflection portion from which the video light incident from the incident portion is reflected toward the emission portion.

In a specific aspect, the first optical member is provided with an angle θ2, formed between the video light incident on the reflection portion and the video light reflected by the reflection portion, satisfying 30°≤θ2≤90°. In this case, by setting the arrangement angle of the first optical member to be relatively large with the angle θ2 being within the range described above, the optical system can be downsized in the height direction, that is the vertical direction or the longitudinal direction of the optical system.

In a specific aspect, a distance Ln from a pupil to the first optical member in a horizontal direction satisfies the following equation:

$$Ln = L2 \cos θ3 − L1 \cos(θ3+θ1)$$

where θ3 represents an angle formed between the horizontal direction and the video light reflected by the reflection member to the position of the pupil, L1 represents an optical path length of the video light incident on the reflection member from the first optical member, and L2 represents an optical path length of the video light reflected by the reflection member to the position of the pupil.

In a specific aspect, the display element is provided with an angle θ4, formed between a horizontal direction and the video light incident on the reflection portion of the first optical member, satisfying θ4≤10°.

In a specific aspect, a second optical member disposed between the first optical member and the display element is further included.

In a specific aspect, a supporting member supporting the display element, the first optical member, and the reflection member, and a mounted member coupled to the supporting member and mounted to the head of a user are further included.

What is claimed is:

1. A head-mounted display apparatus comprising:
   a circuit configured to function as a control unit that corrects a video;
   a display element configured to display the video corrected by the control unit;
   a first optical member on which video light corresponding to the video is incident; and
   a reflection member configured to reflect the video light from the first optical member to project a virtual image corresponding to the video, wherein
   the first optical member and the reflection member correct distortion of the virtual image in a first direction,
   the control unit corrects the video based on distortion of the virtual image in a second direction crossing the first direction, and
   the control unit corrects the video to satisfy the following equation:

$$U = ax + bxy$$

where y represents a coordinate of the video before correction in the first direction, x represents a coordinate of the video before the correction in the second direction, U represents a coordinate of the video after the correction in the second direction, a represents a coefficient corresponding to a length of the video after the correction in the second direction, and b represents a coefficient corresponding to an angle formed between sides of the video after the correction in the first direction and the second direction.

2. The head-mounted display apparatus according to claim 1, wherein the second direction is a direction corresponding to a scanning direction of the display element.

3. The head-mounted display apparatus according to claim 2, wherein the control unit corrects the video to make a length of the video in the second direction on one side in the first direction shorter than a length of the video in the second direction on another side in the first direction.

4. The head-mounted display apparatus according to claim 1, wherein
   the control unit corrects the video to satisfy the following equation:

$$U = ax + bxy + cy$$

where c represents a coefficient corresponding to distortion of inclination of the video after the correction on one side in the second direction and inclination of the video after the correction on another side in the second direction.

5. The head-mounted display apparatus according to claim 4, wherein the coefficient a, the coefficient b, and the coefficient c are rewritable parameters.

6. The head-mounted display apparatus according to claim 1, wherein
   the display element displays a first video including a first wavelength, a second video including a second wavelength shorter than the first wavelength, and a third video including a third wavelength longer than the first wavelength,
   a length of the first video in the second direction is a length between a length of the second video in the second direction and a length of the third video in the second direction, and
   a length of the first video in the first direction is the same as a length of the second video in the first direction and a length of the third video in the first direction.

7. The head-mounted display apparatus according to claim 1, wherein
   the video after the correction includes a first corrected region after the correction obtained by correcting a first region of the video before the correction and a second corrected region after the correction obtained by correcting a second region of the video before the correction, the second region and the first region being arranged side by side in the second direction, and
   the number of pixels in the second direction in the first corrected region after the correction is within ±10% of the number of pixels in the second direction in the second corrected region after the correction.

8. The head-mounted display apparatus according to claim 1, wherein the reflection member is provided with an angle θ1, formed between the video light incident on the reflection member from the first optical member and the video light reflected to a position of a pupil by the reflection member, satisfying 10°≤θ1≤70°.

9. The head-mounted display apparatus according to claim 1, wherein
   the first optical member includes:
      an incident portion on which the video light from the display element is incident,
      an emission portion from which the incident video light is emitted toward the reflection member, and
      a reflection portion from which the video light incident from the incident portion is reflected toward the emission portion.

10. The head-mounted display apparatus according to claim 9, wherein the first optical member is provided with an angle θ2, formed between the video light incident on the reflection portion and the video light reflected by the reflection portion, satisfying 30°≤θ2≤90°.

11. The head-mounted display apparatus according to claim 9, wherein
a distance Ln from a pupil to the first optical member in a horizontal direction satisfies the following equation:

$$Ln = L2 \cos θ3 - L1 \cos(θ3+θ1)$$

where θ3 represents an angle formed between the horizontal direction and the video light reflected by the reflection member to a position of the pupil, L1 represents an optical path length of the video light incident on the reflection member from the first optical member, and L2 represents an optical path length of the video light reflected by the reflection member to the position of the pupil.

12. The head-mounted display apparatus according to claim 9, wherein the display element is provided with an angle θ4, formed between a horizontal direction and the video light incident on the reflection portion of the first optical member, satisfying θ4≤ 10°.

13. The head-mounted display apparatus according to claim 1, further comprising a second optical member disposed between the first optical member and the display element.

14. The head-mounted display apparatus according to claim 1, further comprising:
a supporting member supporting the display element, the first optical member, and the reflection member; and
a mounted member coupled to the supporting member and mounted to a head of a user.

15. A head-mounted display apparatus comprising:
a circuit configured to function as a control unit that corrects a video;
a display element configured to display the video corrected by the control unit;
a first optical member on which video light corresponding to the video is incident; and
a reflection member configured to reflect the video light from the first optical member to project a virtual image corresponding to the video, wherein
the first optical member and the reflection member correct distortion of the virtual image in a first direction,
the control unit corrects the video based on distortion of the virtual image in a second direction crossing the first direction,
the display element displays a first video including a first wavelength, a second video including a second wavelength shorter than the first wavelength, and a third video including a third wavelength longer than the first wavelength,
a length of the first video in the second direction is a length between a length of the second video in the second direction and a length of the third video in the second direction, and
a length of the first video in the first direction is the same as a length of the second video in the first direction and a length of the third video in the first direction.

* * * * *